United States Patent
Nakamura et al.

(10) Patent No.: US 7,583,895 B2
(45) Date of Patent: Sep. 1, 2009

(54) POLARIZATION SCRAMBLER, OPTICAL ADD/DROP MULTIPLEXER, OPTICAL ROUTE SWITCHING APPARATUS AND WAVELENGTH DIVISION MULTIPLEXING OPTICAL TRANSMISSION SYSTEM

(75) Inventors: Kentaro Nakamura, Kawasaki (JP); Masahiro Yuki, Kawasaki (JP); Takeshi Hoshida, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 11/517,392

(22) Filed: Sep. 8, 2006

(65) Prior Publication Data

US 2007/0248361 A1 Oct. 25, 2007

(30) Foreign Application Priority Data

Apr. 21, 2006 (JP) ............................. 2006-118580

(51) Int. Cl.
*H04B 10/00* (2006.01)
*H04B 10/12* (2006.01)
*H04J 14/06* (2006.01)

(52) U.S. Cl. .................... 398/65; 398/152; 398/158; 398/147

(58) Field of Classification Search ............... 398/65, 398/147–150, 152, 158, 159
See application file for complete search history.

(56) References Cited

U.S. PATENT DOCUMENTS

| 5,920,413 | A | 7/1999 | Miyakawa et al. | 359/130 |
| 6,904,238 | B2 * | 6/2005 | Beal et al. | 398/37 |
| 7,010,180 | B2 | 3/2006 | Van Wijngaarden et al. | 385/11 |
| 7,031,614 | B2 * | 4/2006 | Fujiwara et al. | 398/152 |
| 2001/0010693 | A1 | 8/2001 | Wedding et al. | 370/400 |
| 2003/0175034 | A1 * | 9/2003 | Noe | 398/152 |
| 2005/0226633 | A1 | 10/2005 | Liu | 398/152 |

FOREIGN PATENT DOCUMENTS

| JP | 9-275378 | 10/1997 |
| JP | 2001-268010 | 9/2001 |
| JP | 2005-65273 | 3/2005 |
| JP | 2005-295559 | 10/2005 |

OTHER PUBLICATIONS

Z. Li, et al., "Experimental Evaluation of the Effect of Polarization Scrambling Speed on the Performance of PMD Mitigation Using FEC", OFC2004, MF69, 2004, Feb. 2004.

* cited by examiner

*Primary Examiner*—Dalzid Singh
(74) *Attorney, Agent, or Firm*—Staas & Halsey LLP

(57) ABSTRACT

A polarization scrambler has a polarization state rotating unit rotating the polarization state of a signal light, and a rotation speed controlling unit controlling the rotation speed of the polarization state in the polarization state rotating unit on the basis of the speed and scheme of modulation of the signal light, and the value of polarization mode dispersion of a transmission path on which the signal light is to be transmitted. Degradation of the transmission quality due to PMD is more mitigated than the known techniques.

19 Claims, 24 Drawing Sheets

| Modulation system A | | | | | | Modulation system B | | | | | |
|---|---|---|---|---|---|---|---|---|---|---|---|
| | | Value of PMD [ps] | | | | | | Value of PMD [ps] | | | |
| | | 10 | 20 | 30 | 40 | | | 10 | 20 | 30 | 40 |
| Bitrate [Gbit/s] | 2.5 | (Rotation speed) | ... | ... | ... | Bitrate [Gbit/s] | 2.5 | (Rotation speed) | ... | ... | ... |
| | 10 | ... | ... | ... | ... | | 10 | ... | ... | ... | ... |
| | 20 | ... | ... | ... | ... | | 20 | ... | ... | ... | ... |
| | 40 | ... | ... | ... | ... | | 40 | ... | ... | ... | ... |

5

POLARIZATION SCRAMBLER, OPTICAL ADD/DROP MULTIPLEXER, OPTICAL ROUTE SWITCHING APPARATUS AND WAVELENGTH DIVISION MULTIPLEXING OPTICAL TRANSMISSION SYSTEM

BACKGROUND OF THE INVENTION

1) Field of the Invention

The present invention relates to a polarization scrambler, and an optical add/drop multiplexer, an optical route switching apparatus and a wavelength division multiplexing optical transmission system using the polarization scrambler.

2) Description of Related Art

It is general that the core of single mode fibers (SMF: Single Mode Fiber) used in optical transmission lines in optical transmission systems is not round but slightly elliptic, which induces birefringence. An optical signal inputted to such optical fiber is separated into two rectangular polarization mode components, that is, a fast-wave axis and a slow-wave axis.

Since the transmission speed in the fiber differs between the two polarization mode components separated into the fast-wave and the slow-wave, differential group delay (DGD: Differential Group Delay) generates between the modes. Generation of the differential group delay between the modes causes a difference in transmission speed between the fast-wave and the slow-wave even in one optical pulse, which may induce considerable degradation of the transmission quality, depending on the state of the polarization particularly in high-speed signals at short pulse intervals.

Polarization mode dispersion (PMD: Polarization Mode Dispersion) is a phenomenon that the signal waveform is distorted by that the cross sectional shape of an optical fiber is deviated from idealistic round by a small stress applied to the optical fiber. PMD has a characteristic that is fluctuated with time by a change in environments of the transmission line such as temperature, stress and the like, almost without correlation between the wavelengths.

A wavelength division multiplexing (WDM: Wavelength Division Multiplexing) optical transmission system having a transmission speed of 10 Gb/s per wave is put to practical use, at present. Further, practical application of an optical transmission system having a transmission speed of 40 Gb/s is under examination, at present. In such high-speed optical transmission systems, degradation of the transmission quality due to PDM as discussed above cannot be ignored, which is one of factors that limit the transmission distance.

Some modulation schemes for optically modulating data signals may require a device having relatively large polarization dependency of the transmission speed as a device constituting a receiver. In such case, necessity for a measure against the above-mentioned PMD increases in order to improve the receiving quality.

For the purpose of mitigating degradation of the transmission quality due to PMD, various methods are under examination. For example, there is a method for mitigating the maximum penalty due to PMD with a polarization scrambler in the transceiver, as disclosed in Patent Document 1 described below. Patent Documents 2 and 3 disclose a constitution where, in a point-to-point wavelength division multiplexing optical communication system having a pair of optical-transmitting and optical-receiving apparatuses opposite to each other, a polarization scrambler is disposed in the repeating stage on the transmission path.

Degradation of the transmission quality due to PMD changes from zero to the maximum according to the input polarization state to a medium having PMD, which leads to variation in degradation of the transmission quality. Thus, it is required to keep the transmission quality constant. However, the techniques disclosed in Patent Documents 1 through 3 apply a polarization scrambler to the input portion to scramble the input polarization state at any time, thereby to uniformly generate a state where the transmission quality degradation penalty due to PMD is small and a state where the same is large. As this, the transmission quality degradation stays neither in the best state nor the worst state so that the averaged transmission quality of the system is kept above a constant level.

In the techniques disclosed in Patent Documents 1 through 3, the speed of scrambling in the polarization scrambler is set to be sufficient to average the degradation of the transmission quality within one processing unit of error correction code.

As other known techniques relating to the present invention, there are techniques disclosed in Patent Document 4 and Non-Patent Document 1.

[Patent Document 1] Japanese Patent Application Laid-Open Publication No. 2001-268010

[Patent Document 2] Japanese Patent Application Laid-Open Publication No. 2005-295559

[Patent Document 3] Japanese Patent Application Laid-Open Publication No. 2005-65273

[Patent Document 4] Japanese Patent Application Laid-Open Publication No. HEI 9-275378

[Non-Patent Document 1] Zhihong Li, Jinyu Mo, Yi Dong, Yixin Wang, Chao Lu, "Experimental evaluation of the effect of polarization scrambling speed on the performance of PMD mitigation using EFC," OFC2004, MF69, 2004

However, when an optical add/drop multiplexer (OADM: Optical Add/Drop Multiplexer), particularly, a reconfigurable optical add/drop multiplexer (R-OADM: Reconfigurable Optical Add/Drop Multiplexer) or a wavelength-convertible dynamic optical add/drop multiplexer (D-OADM: Dynamic Optical Add/Drop Multiplexer), or an optical HUB device is applied on a transmission path, the transmission path is more complicated than a point-to-point transmission path that the techniques disclosed in Patent Documents 1 to 3 suppose. Thus, that what kind of signal is transmitted on what path changes according to circumstances.

The techniques disclosed in the above Patent Documents 1 to 3 set the scrambling speed to a speed sufficient to average degradation of the transmission quality within one processing unit for error correction code. However, high speed scrambling causes that the received waveform is fluctuated at high speed, which may cause an increase in noise in the receiving system. For this, it is sometimes difficult to keep excellent transmission quality only by setting the scrambling speed within a range of speed sufficient to average degradation of the transmission quality within one processing unit for error correction code.

In an optical communication system having a transmission path configuration more complicated than the point-to-point transmission line as discussed above, it is necessary to set an optimum polarization scrambling speed to each path set for each wavelength. However, the above known techniques do not disclose such constitution.

Meanwhile, Patent Document 3 discloses a scrambling speed of a polarization scrambler according to the type of modulation scheme, whereas Non-Patent Document 1 discloses a scrambling speed according to the value of PMD. However, these documents do not mention a technique for setting the scrambling speed in a repeater such as an OADM device accommodating a plurality of paths set for respective wavelengths.

In an optical communication system having an optical add/drop multiplexer or a transmission path configuration more complicated than a point-to-point transmission path, the modulation scheme and modulation speed of a signal light passing through a specific polarization scrambler on the transmission path and a value of PMD passing through the polarization scrambler fluctuate when the path is switched, for example. In such case, a constitution that can perform optimally polarization scrambling even when these fluctuations occur is required in order to secure excellent transmission quality.

SUMMARY OF THE INVENTION

In the light of the above problems, an object of the present invention is to more mitigate degradation of the transmission quality due to PMD than the known techniques.

Another object of the present invention is to be able to set a scrambling speed to each path in a repeating apparatus such as an OADM apparatus or the like accommodating a plurality of paths set to respective wavelengths.

To attain the above object, the present invention provides a polarization scrambler comprising a polarization state rotating unit for rotating a polarization state of a signal light, and a rotation speed controlling unit for controlling a rotation speed of the polarization state in the polarization state rotating unit on the basis of a speed and scheme of modulation of the signal light and a value of polarization mode dispersion of a transmission path on which the signal light is to be transmitted.

In the above case, the rotation speed controlling unit may comprise an information receiving unit for receiving information on the speed and scheme of modulation of the signal light and the value of polarization mode dispersion of the transmission path on which the signal light is to be transmitted, a speed table for holding rotation speed information at which the polarization state is to be rotated according to a combination of the speed and scheme of modulation of the signal light and the value of polarization mode dispersion of the transmission path on which the signal light is to be transmitted, and a control signal outputting unit for determining the rotation speed information at which the polarization state of the signal light is to be rotated by referring to the speed table on the basis of the combination of the speed and scheme of modulation of the signal light and the value of polarization mode dispersion of the transmission path on which the signal light is to be transmitted received by the information receiving unit, and outputting a control signal containing the rotation speed information to the polarization state rotating unit, whereas the polarization state rotating unit may comprise a rotating unit for rotating the polarization state of an input signal light on the basis of a drive signal, and a rotation driving unit for outputting the drive signal to the rotating unit in order to rotate the polarization state of the input signal light by the rotating unit according to the rotation speed information contained in the control signal supplied from the control signal outputting unit.

The present invention further provides an optical add/drop multiplexer comprising a demultiplexing unit for demultiplexing a signal light into wavelength components, and being able to output at least one of the wavelength components through a drop port, a multiplexing unit being able to be inputted thereto at least one of the demultiplexed wavelength components through a through port, multiplex the wavelength component inputted through the through port and at least one wavelength component inputted through an add port together into a wavelength division multiplexed signal light, and output the wavelength division multiplexed signal light, and at least one polarization scrambler for rotating a polarization state of a corresponding one of the wavelength components to be multiplexed together into the wavelength division multiplexed signal light by the multiplexing unit and to be outputted therethrough, the polarization scrambler comprising a polarization state rotating unit for rotating the polarization state of the wavelength component to be outputted through the multiplexing unit, and a rotation speed controlling unit for controlling a rotation speed of the polarization state of the wavelength component in the polarization state rotating unit on the basis of a speed and scheme of modulation of the wavelength component and a value of polarization mode dispersion of a transmission path on which the wavelength component is to be transmitted.

In the above case, the polarization scrambler may be disposed on a path passing through the add port to rotate the polarization state of the wavelength component to be inputted to the multiplexing unit through the add port. Alternatively, the polarization scrambler may be disposed on a path passing through the through port to rotate the polarization state of the wavelength component to be inputted to the multiplexing unit through the through port. Further, a plurality of the polarization scramblers may be disposed on paths passing through a plurality of the add ports, respectively.

The optical add/drop multiplexer may further comprise a provisional demultiplexing unit for demultiplexing a signal light to be inputted to the demultiplexing unit into a plurality of output streams of respective wavelength components, the at least one polarization scrambler being disposed over one of the output streams from the provisional demultiplexing unit to rotate the polarization state of a corresponding wavelength component from the provisional demultiplexing unit, and a combining unit for combining the plural output streams and outputting the combined streams to the demultiplexing unit.

The optical add/drop multiplexer may still further comprise a provisional demultiplexing unit for demultiplexing a signal light outputted from the multiplexing unit into a plurality of output streams of respective wavelength components, the at least one polarization scrambler being disposed over one of the output streams from the provisional demultiplexing unit to rotate the polarization state of a corresponding wavelength component from the provisional demultipelxing unit, and a combining unit for combining the output streams and outputting the combined stream as an output light signal.

A plurality of the polarization scramblers may be disposed, and the rotation speed controlling unit may be shared by the plural polarization scramblers.

The rotation speed controlling unit may receive setting information on a network including the optical add/drop multiplexer from a managing apparatus managing the network, and control a speed at which the polarization state is to be rotated by the polarization state rotating unit on the basis of the setting information on the network.

The optical add/drop multiplexer may still further comprise a transmission quality monitor for monitoring transmission quality of the wavelength component outputted through the drop port, and the rotation speed controlling unit may comprise a monitoring result obtaining unit for obtaining a monitoring result from the transmission quality monitor on the basis of the setting information on the network from the managing apparatus, and a feedback controlling unit for feedback-controlling a rotation speed at which the polarization state is to be rotated on the basis of the monitoring result obtained by the transmission quality monitor.

The demultiplexing unit may comprise an optical DEMUX unit for demutliplexing a signal light into a plurality of wavelength components, and a plurality of distributing units each of which splits each of the plural wavelength components demultiplexed by the optical DEMUX unit into two, at least one of the two wavelength components split by the distributing unit being able to be outputted through a corresponding drop port, and the multiplexing unit may comprise a plurality of 2×1 switches disposed for the respective wavelength components, each of the 2×1 switches being inputted thereto the other one of the two wavelength components split by a corresponding one of the distributing units through a corresponding through port, and selectively outputting either the other wavelength component inputted through the through port or a wavelength component inputted through a corresponding add port, and an optical MUX unit being able to multiplex outputs from the plural 2×1 switches together into a wavelength division multiplexed signal light and output the wavelength division multiplexed signal light.

Alternatively, the demultiplexing unit may comprise a distributing unit for splitting a signal light into two signal lights, and a wavelength selective switch being able to demultiplex one of the two signal lights split by the distributing unit into wavelength components, arbitrarily select the drop port(s) as (an) output destination port(s) for the demultiplexed wavelength component(s), and output the wavelength component(s) through the drop port(s), whereas the multiplexing unit may comprise a wavelength selective switch inputted thereto the other one of the two signal lights split by the distributing unit through the through port, inputted thereto (a) wavelength component(s) through the add port(s), and being able to selectively output (an) arbitrary wavelength component(s) inputted from the through port and/or the add port(s).

The present invention still further provide an optical route switching apparatus having a plurality of input ports and a plurality of output ports, selectively directing a route of each of wavelength components of a wavelength division multiplexed signal light inputted from each of the plural input ports to an arbitrary one of the plural output ports, multiplexing wavelength components led to each of the output ports together into a wavelength division multiplexed signal light, and outputting the same from the output port, the optical route switching apparatus comprising at least one polarization scrambling apparatus disposed at a position of at least one of the input ports or at least one of the output ports of the optical route switching apparatus, the polarization scrambling apparatus being able to rotate a polarization state of at least one wavelength component of the wavelength division multiplexed signal light, the polarization scrambling apparatuses comprising a provisional demultiplexing unit for demultiplexing the wavelength division multiplexed signal light into a plurality of output streams of respective wavelength components, at least one polarization scrambler disposed over one of the output steams, the polarization scrambler rotating the polarization state of a corresponding wavelength components of the signal light demultiplexed by the provisional demultiplexing unit, and a combining unit for combining the output streams, the polarization scrambler comprising a polarization state rotating unit for rotating the polarization state of the wavelength component of the signal light from the provisional demultiplexing unit, and a rotation speed controlling unit for controlling a rotation speed of the polarization state of the wavelength component by the polarization state rotating unit on the basis of a speed and scheme of modulation of the wavelength component, and a value of polarization mode dispersion of a transmission path on which the wavelength component is to be transmitted.

The present invention still further provides a wavelength division multiplexing optical transmission system having, on a transmission path, an optical add/drop multiplexer having a demultiplexing unit being able to demultiplex a signal light into wavelength components and output at least one of the wavelength components of the signal light through a drop port, and a multiplexing unit being able to multiplex at least one arbitrary wavelength component inputted through an add port and the demultiplexed wavelength components together into a wavelength division multiplexed signal light and output the wavelength division multiplexed signal light, the wavelength division multiplexing optical transmission system comprising the optical add/drop multiplexer comprising at least one polarization scrambler for rotating a polarization state of a corresponding one of wavelength components of a signal light to be outputted through the multiplexing unit, the polarization scrambler comprising a polarization state rotating unit for rotating the polarization state of the wavelength component of the signal light to be outputted through the multiplexing unit, and a rotation speed controlling unit for controlling rotation speed of the polarization state of the wavelength component of the signal light by the polarization state rotating unit on the basis of a speed and scheme of modulation of the wavelength component of the signal light, and a value of polarization mode dispersion of a transmission path on which the wavelength component is to be transmitted.

According to this invention, it is possible to perform polarization scrambling at a rotation speed at which the transmission quality is optimum according to a scheme and speed of modulation of the signal light and PMD of the path by means of the rotation speed controlling unit of the polarization scrambler to suppress degradation of the quality due to an inappropriate polarization scrambling speed. This enables high-quality transmission, where the effect of averaging the penalty due to PMD induced by polarization scrambling is sufficiently used.

It is also possible to perform polarization scrambling on at least one wavelength component contained in a signal light to be outputted from the multiplexing unit of an optical add/drop multiplexer and traveling on an arbitrary path, at a rotation speed at which the transmission quality is optimum, according to a scheme and speed of modulation of the wavelength component and PMD of the path. This allows mitigation of quality degradation caused by an inappropriate polarization scrambling speed, and allows high-quality transmission where the effect of averaging the penalty due to PMD induced by the polarization scrambling.

DESCRIPTION OF THE PREFERRED EMBODIMENTS

Hereinafter, description will be made of embodiments of the present invention with reference to accompanying drawings. Note that the present invention is not limited to the following embodiments. Other technical problems, means for solving the problems and working effect will be apparent from disclosure of the embodiments, in addition to the object of the present invention.

[A1] Description of First Embodiment

Figures 1, 2:
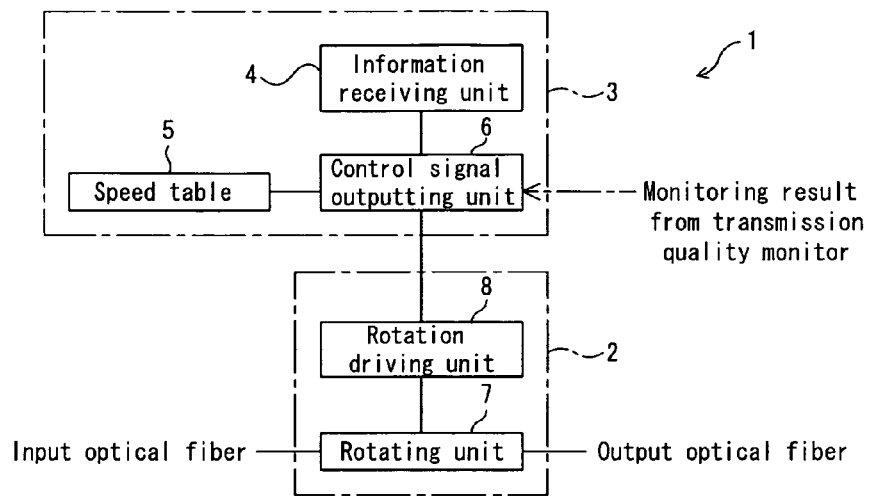
FIG. 1 is a block diagram showing a polarization scrambler according to a first embodiment of this invention.
FIG. 2 is a diagram showing an essential portion of the polarization scrambler according to the first embodiment of this invention.
Figure 3:
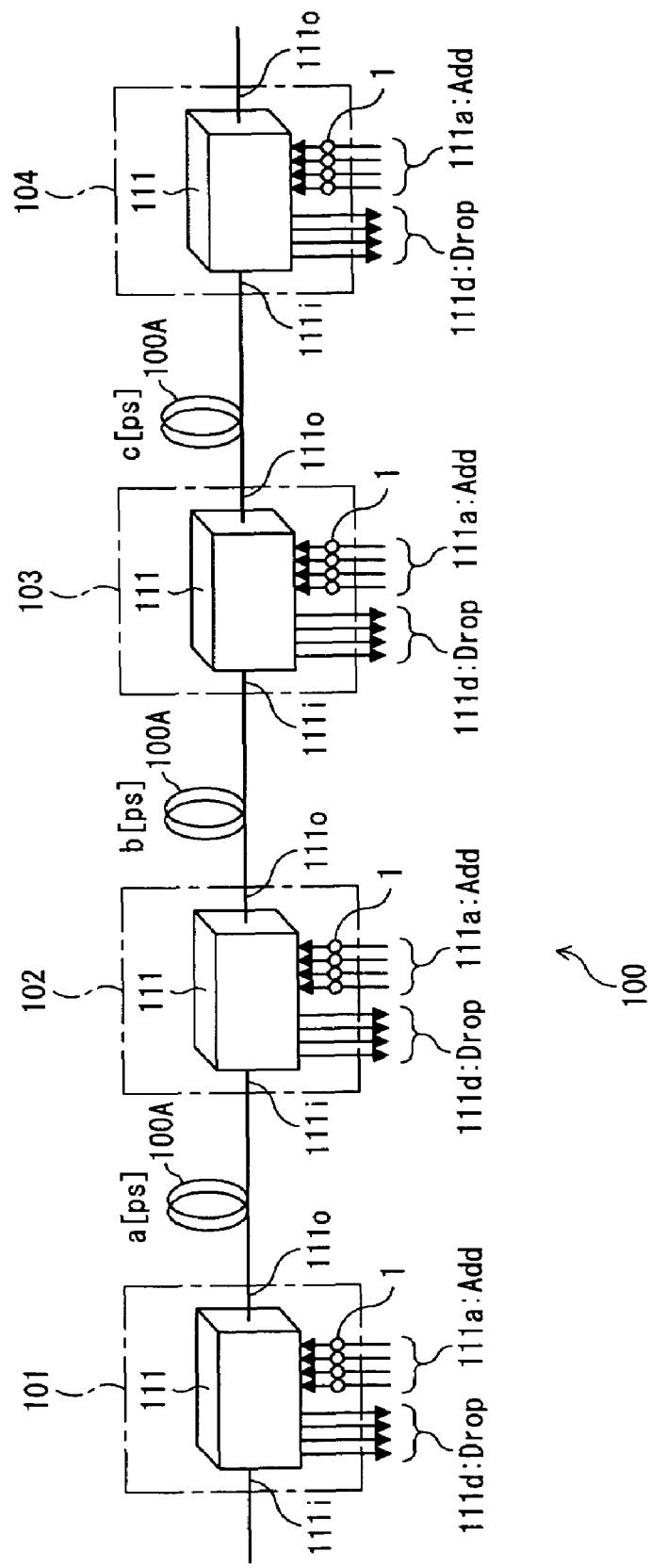
FIG. 3 is a diagram showing a wavelength division multiplexing optical transmission system according to the first embodiment of this invention.

FIG. 1 is a block diagram showing a polarization scrambler according to a first embodiment of the present invention. The polarization scrambler shown in FIG. 1 is mounted in each of OADM nodes 101 through 104 in a wavelength division multiplexing optical transmission system 100, in which the OADM nodes 101 through 104 as being optical add/drop multiplexers are disposed on a transmission path 100A as shown in FIG. 3. The polarization scrambler 1 can variably set the speed of scrambling according to a change in modulating scheme and modulating speed of inputted signal light, and a fluctuation in DGD (or a value of PMD) of a path.

Each of the OADM nodes 101 through 104 shown in FIG. 3 has an add/drop function unit 111, along with the polarization scrambler 1.

The add/drop function unit 111 can output, through a drop port 111d, a wavelength component of a wavelength division multiplexed signal light inputted from the transmission path 100A on the input side through a transmission input port 111i, or wavelength-division-multiplex a wavelength component inputted through an add port 111a and the wavelength components of the wavelength division multiplexed optical signal together, and output a obtained wavelength division multiplexed signal light to the transmission path 100A on the output side through a transmission output port 111o.

The polarization scrambler 1 is disposed at a position where the polarization scrambler 1 can rotate the polarization state of at least one wavelength component of a signal light which is to be outputted from a multiplexer's output, that is, the transmission output port 111o, of the add/drop function unit 111 in each of the OADM nodes 101 through 104.

Concretely, in the first embodiment, the polarization scrambler 1 is disposed at a position of the add port 111a of the add/drop function unit 111 to rotate the polarization state of a wavelength component signal light to be outputted to the transmission path 100A on the output side from the add port 111a. The number of the polarization scramblers 1 may correspond to the number of the add ports 111a.

Namely, the polarization scrambler 1 disposed at each of the add ports 111a rotates the polarization state of an optical signal to be sent out from the add port 11a to uniformly yield a state where the transmission quality degradation penalty due to PMD is small and a state where the same is large, thereby providing excellent and stable transmission quality.

The polarization scrambler 1 disposed at the add port 111a comprises, as shown in FIG. 1, a polarization state rotating unit 2 which rotates the polarization state of a signal light, and a rotation speed controlling unit 3 which controls the rotation speed of the polarization state in the polarization state rotating unit 2 on the basis of the speed and scheme of modulation of the signal light, and a value of polarization mode dispersion of a transmission path on which the signal light is to be transmitted.

The rotation speed controlling unit 3 comprises an information receiving unit 4, a speed table 5 and a control signal outputting unit 6. The information receiving unit 4 receives information about the speed and scheme of modulation of a signal light, and a value of polarization dispersion mode of a transmission path on which the signal light is to be transmitted. In concrete, the information receiving unit 4 receives and holds this information as information on conditions used to control the rotation speed by the rotation speed controlling unit 3, which can be a storage holding information inputted by an operator or the like, for example.

The speed table 5 holds information about the rotation speed of the polarization state, according to a combination of the speed and scheme of modulation of a signal light, and a value of polarization mode dispersion of a transmission path on which the signal light is to be transmitted. The speed table 5 has a structure shown in FIG. 2, for example. The speed table 5 shown in FIG. 2 stores, in the form of matrix, a speed of polarization rotation according to a modulation speed and a value of polarization mode dispersion of a transmission path in each modulation scheme for a signal light. Accordingly, the polarization state of the signal light is rotated at a polarization rotation speed stored in the speed table 5, whereby the transmission quality of the signal light can be optimized.

As to contents to be stored in the speed table 5, a polarization rotation speed at which the optimum transmission quality is provided is beforehand measured or deduced by simulation for each combination of the speed and scheme of modulation of a signal light to be added through the add port 111a and sent out from each of the OADM nodes 101 through 104, and a value of polarization mode dispersion of a transmission path on which the signal light is to be transmitted. When a new menu is added to the speed, scheme or the like of signal light modulation because of a change in specification of an accommodated terminal, a relevant polarization rotation speed is measured or deduced by simulations, and the contents of the speed table 5 are appropriately updated.

The control signal outputting unit 6 refers to the speed table 5 on the basis of a combination of the speed and scheme of modulation of a signal light, and a value of polarization mode dispersion of a transmission path of the signal light received by the information receiving unit 4 to determine speed information at which the polarization state of the signal light is to be rotated, and outputs a control signal based on this speed information to the polarization state rotating unit 2. In concrete, the control signal outputting unit 6 outputs a sine wave signal having a frequency influencing the rotation speed as the control signal to the polarization state rotating unit 2.

As discussed above, the polarization rotation speed at which the transmission quality is optimized differs depending on the polarization mode dispersion value (or DGD value) determined on the basis of a transmission path on which a signal light added through the add port 111a of the OADM 101, 102, 103 or 104 is to be transmitted, and the modulation scheme [for example, NRZ (Non Return to Zero), DPSK (Differential Phase Shift keying) or the like] and the modulation speed of the signal light.

When signal lights on different channels are inputted through the respective add ports 111a to the add/drop function unit 111, a transmission path to the transmission destination of the signal light can be determined according to a relevant add port 111a. Accordingly, a polarization mode dispersion value (or DGD value) of the transmission path is determined according to a position of the relevant add port 111a. In addition, a modulation scheme and the modulation speed of the signal light is determined according to a position of the relevant add port 111a, as well. Therefore, a polarization rotation speed at which the transmission quality is optimized can be determined according to a position of the add port 111a.

The information receiving unit 4 can hold, for each position of the add ports 111a, information about the transmission path and the modulation scheme and speed of an added signal light. The control signal outputting unit 6 outputs a control signal to the polarization state rotating unit 2 on the basis of information about the transmission path and the modulation scheme and speed of a signal light determined from a position of the add port 111a received by the information receiving unit 4 to rotate the polarization state of the signal light so that the transmission quality of the signal light added through the add port 111a is optimum.

The polarization state rotating unit 2 comprises, as shown in FIG. 1, a rotating unit 7 which rotates the polarization state of an input signal light on the basis of a driving signal, and a rotation driving unit 8 which outputs the driving signal to the rotating unit 7 in order to rotate the polarization state by the rotating unit 7 according to the speed information of the control signal supplied from the control signal outputting unit 6. The driving signal from the rotation driving unit 8 to the rotating unit 7 is supplied as a sine wave signal having a frequency similar to that of the control signal from the control signal outputting unit 6. Namely, the rotation speed of the polarization state by the rotating unit 7 is set and controlled by a frequency given to the driving signal.

The rotation speed controlling unit 3 may be shared by the plural polarization scramblers 1 disposed at respective positions of the add ports 111a. This can reduce the size of the system.

FIGS. 4 through 7 are diagrams showing examples of the structure of the OADM nodes 101 to 104 according to the first embodiment of this invention.

Figure 4:
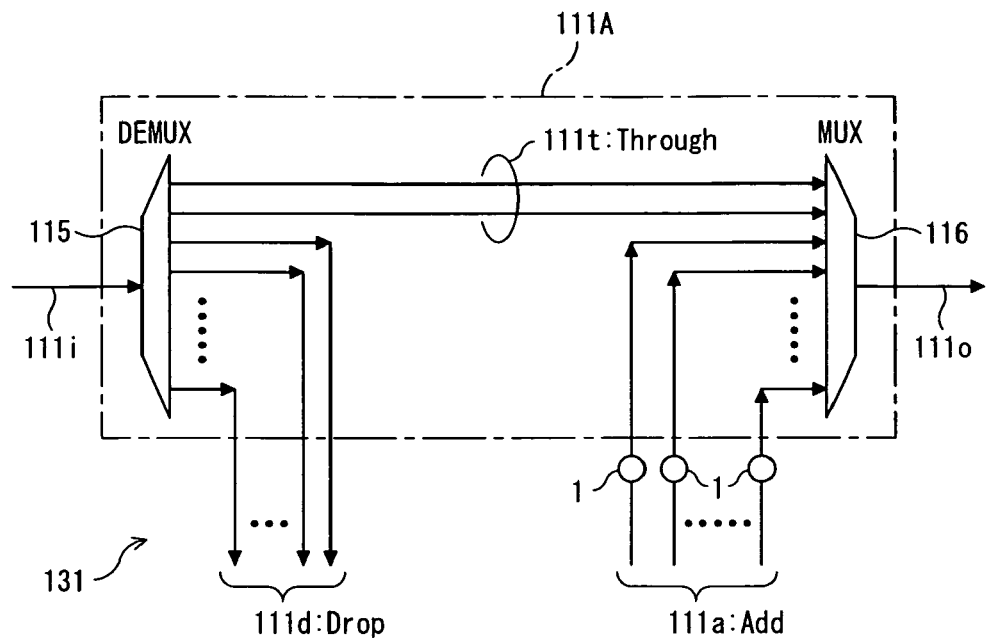
FIGS. 4 through 7 are diagrams showing examples of the structure of an OADM node (optical add/drop multiplexer) according to the first embodiment of this invention.

An OADM node 131 as being an example of the structure shown in FIG. 4 comprises an add/drop function unit 111A corresponding to the add/drop function unit 111 shown in FIG. 3, and polarization scramblers 1 disposed at positions of the respective add ports 111a of the add/drop function unit 111A. The add/drop function unit 111A comprises a DEMUX unit 115 comprised of a demultiplexer and a MUX unit 116 comprised of a multiplexer. The DEMUX unit 115 constitutes a demultiplexing unit which can demultiplex a wavelength division multiplexed signal light inputted through the transmission input port 111i into wavelength components, and output at least one wavelength component of the demultiplexed wavelength components through a drop port. The MUX unit 116 constitutes a multiplexing unit which can be inputted signal lights of the wavelength components demultiplexed by the DEMUX unit 115 through the respective through ports 111t, can multiplexe together (wavelength-division-multiplex) the signal lights inputted through the through ports 111t and a signal light of a wavelength component inputted through an add port 111a, and can output a multiplexed signal light.

At this time, the polarization state of the signal light of a wavelength component inputted to the MUX unit 116 through the add port 111a is rotated by a polarization scrambler 1 disposed at a position of this add port 111a, whereby the transmission quality can be kept excellent.

Figure 5:
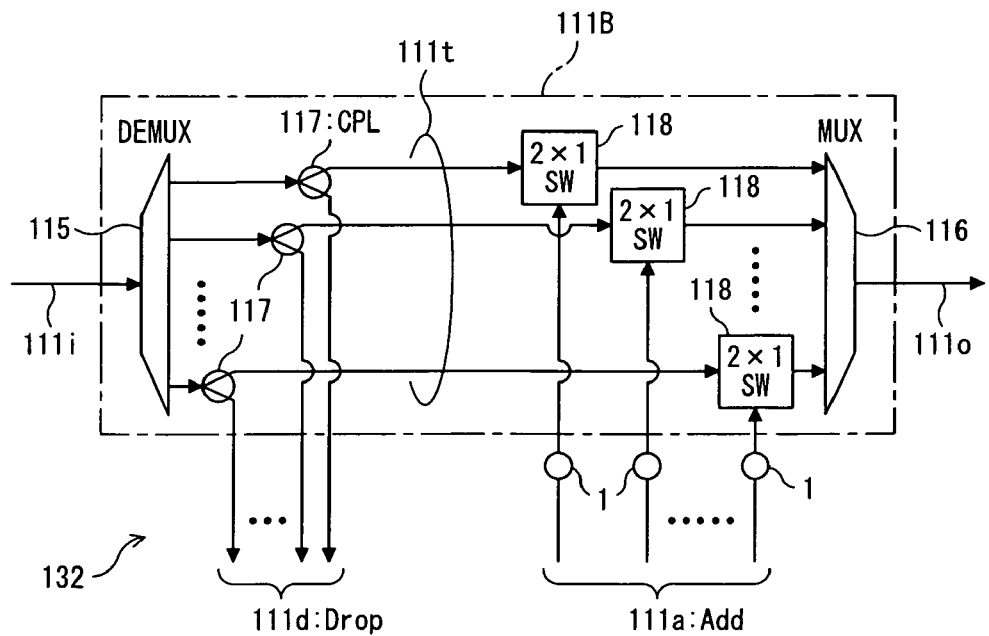

An OADM node 132 as being an example of the structure shown in FIG. 5 comprises an add/drop function unit 111B which is an R-OADM (Reconfigurable-OADM) which is reconfigurable, and polarization scramblers 1 at positions of the respective add ports 111a of the add/drop function unit 111B. The add/drop function unit 111B comprises optical couplers 117 and 2×1 switches 118, along with the DEMUX unit 115 and the MUX unit 116.

The optical DEMUX unit 115 demultiplexes a signal light into a plurality of wavelength components. Each of the optical couplers 117 is a distributing unit which is disposed for each of the plural wavelength components demultiplexed by the optical DEMUX unit 115 to split the wavelength component signal light demultiplexed by the optical DEMUX unit 115 into two. The DEMUX unit 115 and the optical couplers 117 together constitute a demultiplexing unit, which can output one of the wavelength component signal lights split into two by the optical coupler 117 to the MUX unit 116 in the following stage through a relevant through port 111t, while outputting the other wavelength component signal light as a drop signal.

Each of the 2×1 switch 118 is inputted, through the through port 117, one of the wavelength component signal lights split into two by the optical coupler 117, which is the distributing unit, and selectively outputs either the wavelength component signal light from the through port 111t or a signal light having a wavelength component inputted through a relevant add port 11a among the plural add ports 111a. For the purpose of a switching of each wavelength component, a plurality of the 2×1 switches are provided. The MUX unit 116 can multiplex (wavelength-division-multiplex) signal lights selectively outputted from the plural 2×1 switches 118, and output a multiplexed signal light through a transmission output port 111o. Accordingly, the plural 2×1 switches 118 and the optical MUX unit 116 together constitute a multiplexing unit.

The polarization state of a signal light having a wavelength component inputted to the MUX unit 116 through the add port 111a and the 2×1 switch 118 is rotated by a relevant polarization scrambler 1 so that the transmission quality thereof is favorable.

Figure 6:
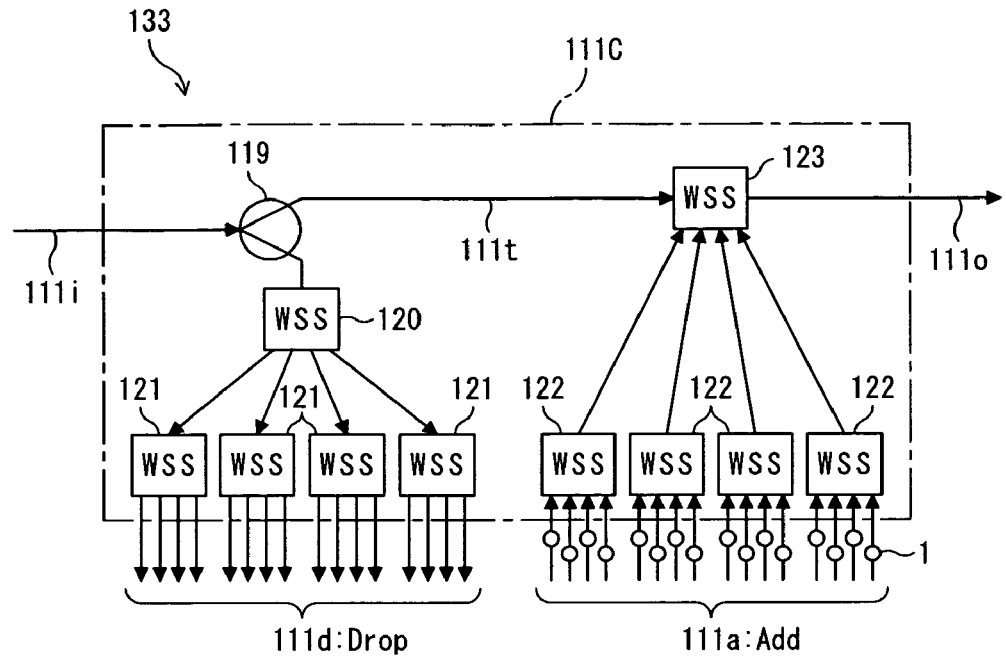

An OADM node 133 as being an example of the structure shown in FIG. 6 comprises an add/drop function unit 111C constituting a D-OADM (Dynamic-OADM), and polarization scramblers 1 at positions of respective add ports 111a of the add/drop function unit 111C. The add/drop function unit 111C comprises, as a demultiplexing unit, an optical coupler 1119, a drop-side first wavelength selective switch (WSS: Wavelength Selective Switch) 120, and a plurality (four in the case of FIG. 6) of drop-side second wavelength selective switches 121, along with, as a multiplexing unit, a plurality (four in the case of FIG. 6) of add-side first wavelength selective switches 122 and an add-side second wavelength selective switch 123.

The optical coupler 119 constitutes a distributing unit which splits a wavelength division multiplexed signal light inputted through a transmission input port 111i into two. The drop-side first wavelength selective switch 120 receives one of the wavelength division multiplexed signal lights split into two by the optical coupler 119, and selectively outputs a wavelength component of the split signal light to one of a plurality (four in the case of FIG. 6) of output ports. Each of the drop-side second wavelength selective switches 121 is connected to a corresponding one of the output ports of the drop-side first wavelength selective switch 120 to selectively output the wavelength component of the signal light outputted from the drop-side first wavelength selective switch 120 to one of its output ports corresponding to drop ports 111d. The wavelength selective switches 120 and 121 are associated with each other to constitute a wavelength selective switch, which can demultiplex one of signal lights split into two by the optical coupler 119 into wavelength components, selectively switch a wavelength component to one of plural output destination ports being drop ports 111d, and output the wavelength component.

The add-side first wavelength selective switches 122 takes charge of signal optical routes at a plurality (16 in the case of FIG. 6) of add ports 111a and connected thereto. Each of the add-side first wavelength selective switches 122 takes charge of signal optical routes at a plurality (four in the case of FIG. 6) of the add ports 111a, and is connected thereto to selectively switch an add signal light from a relevant signal optical route, and outputs the signal light to the add-side second wavelength selective switch 123. To the add-side second wavelength selective switch 123, connected is a signal optical route outputted from the add-side first wavelength selective switch 122, and also connected is one of the signal optical routes split into two by the optical coupler 119 through a through port 111t. The add-side wavelength selective switch 123 selectively switches a wavelength component of signal lights on these optical signal routes, and outputs the wavelength component through a transmission output port 111o. The wavelength selective switches 122 and 123 are associated with each other to constitute a wavelength selective switch which can be inputted thereto one of signal lights split into two by the optical coupler 119 through a through port 111t, and also inputted a signal light having a wavelength component through an add port 111a, and selectively output a wavelength component of the signal light from the through port 111t or the add port 111a.

The polarization state of a wavelength component, which will constitute a wavelength division multiplexed signal light, to be outputted from the transmission output port 111o through a relevant add port 111a, a relevant wavelength selective switch 122 and the wavelength selective switch 123, is rotated by a polarization scrambler 1 disposed on a path of the add port 111a, whereby the transmission quality thereof can be kept excellent.

Figure 7:
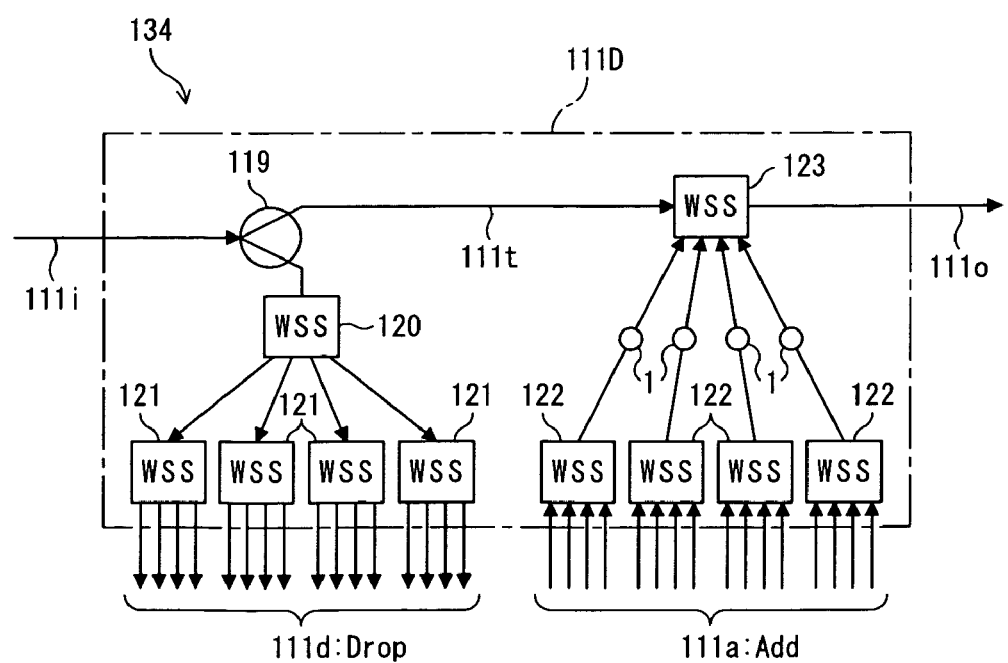

An add/drop function unit 111D of an OADM node 134 as being an example of the structure shown in FIG. 7 has a structure similar to that of the add/drop function unit (refer to a reference numeral 111C) described above with reference to FIG. 6. In addition, the add/drop function unit 111D is provided with polarization scramblers 1, each of which is disposed on a path (path from an add port) between a relevant add-side first wavelength selective switch 122 and an add-side second wavelength selective switch 123. The other structures of the add/drop function unit 111D are basically the same as the above-mentioned case shown in FIG. 6, where like reference characters in FIG. 7 designate like or corresponding parts in FIG. 6. As shown in FIG. 7, the position of the polarization scrambler 1 is not limited to a position of the add port of the add/drop function unit 111D, but the polarization scrambler 1 may be disposed on an optical path (path from an add port) of a signal light before the signal light added from the add port is multiplexed with a signal light from the through port.

In the add/drop function unit 111D, the polarization states of signal lights inputted from the same first wavelength selective switch 122 to the add-side second wavelength selective switch 123 are rotated by the same polarization scrambler 1.

In the wavelength division multiplexing transmission system 100 of the above structure according to the first embodiment of this invention, the add/drop function unit 111 of each of the OADM nodes 101 through 104 adds/drops a signal light. The polarization state of a signal light inputted through an add port 111a and to be outputted through the transmission output port 111o is rotated by a relevant polarization scrambler 1 at a rotation speed set and controlled on the basis of the scheme and speed of modulation of the signal light and a value of PMD of a transmission path to the transmission destination.

Figure 8:
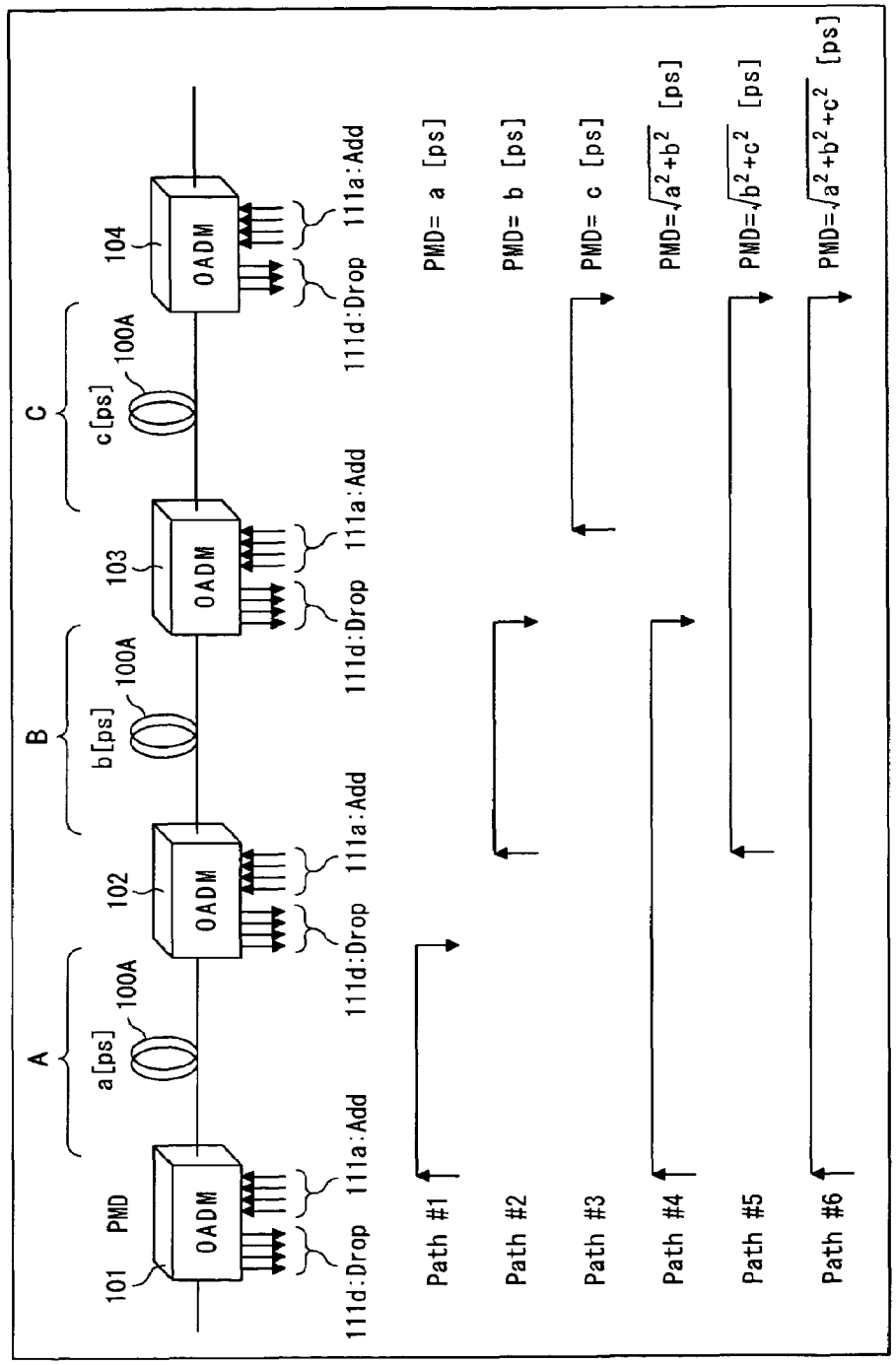
FIG. 8 is a diagram for illustrating an example of values of PMD according to transmission paths in the wavelength division multiplexing optical transmission system according to the first embodiment of this invention.

FIG. 8 is a diagram for illustrating an example of values of PMD of transmission paths in the above wavelength division multiplexing optical transmission system 100. Assuming here that a value of PMD of a section A between the OADM node 101 and the OADM node 102 is a[ps], a value of PMD of a section B between the OADM node 102 and the OADM node 103 is b[ps], and a value of PMD of a section C between the OADM node 103 and the OADM node 104 is c[ps]. Values of PMD of paths #1 through #6 are given as follows.

Values of PMD of the sections A to C as being the paths #1 to #3 are a[ps] to c[ps], respectively. Accordingly, a value of PMD of the section A and section B as being the path #4 is given by an equation (1). A value of PMD of the section B and section C as being the path #5 is given by an equation (2). A value of PMD of the section A, section B and section C as being the path #6 is given by an equation (3). As this, a value of PMD varies depending on a path #1, #2, . . . , or #6 used as the transmission path.

$$PMD \text{ of path } \#4 = \sqrt{a^2 + b^2} \, [ps] \quad (1)$$

$$PMD \text{ of path } \#5 = \sqrt{b^2 + c^2} \, [ps] \quad (2)$$

$$PMD \text{ of path } \#6 = \sqrt{a^2 + b^2 + c^2} \, [ps] \quad (3)$$

In the first embodiment, the polarization scrambler 1 can set and control the polarization rotation speed for each path at the add port 111a, whereby the polarization rotation operation is accomplished so that the transmission quality is optimized according to a value of PMD, which is varied depending on a path, and the modulation scheme and modulation speed (or bit rate) of a signal light passing through the add port 111a.

Figure 9:
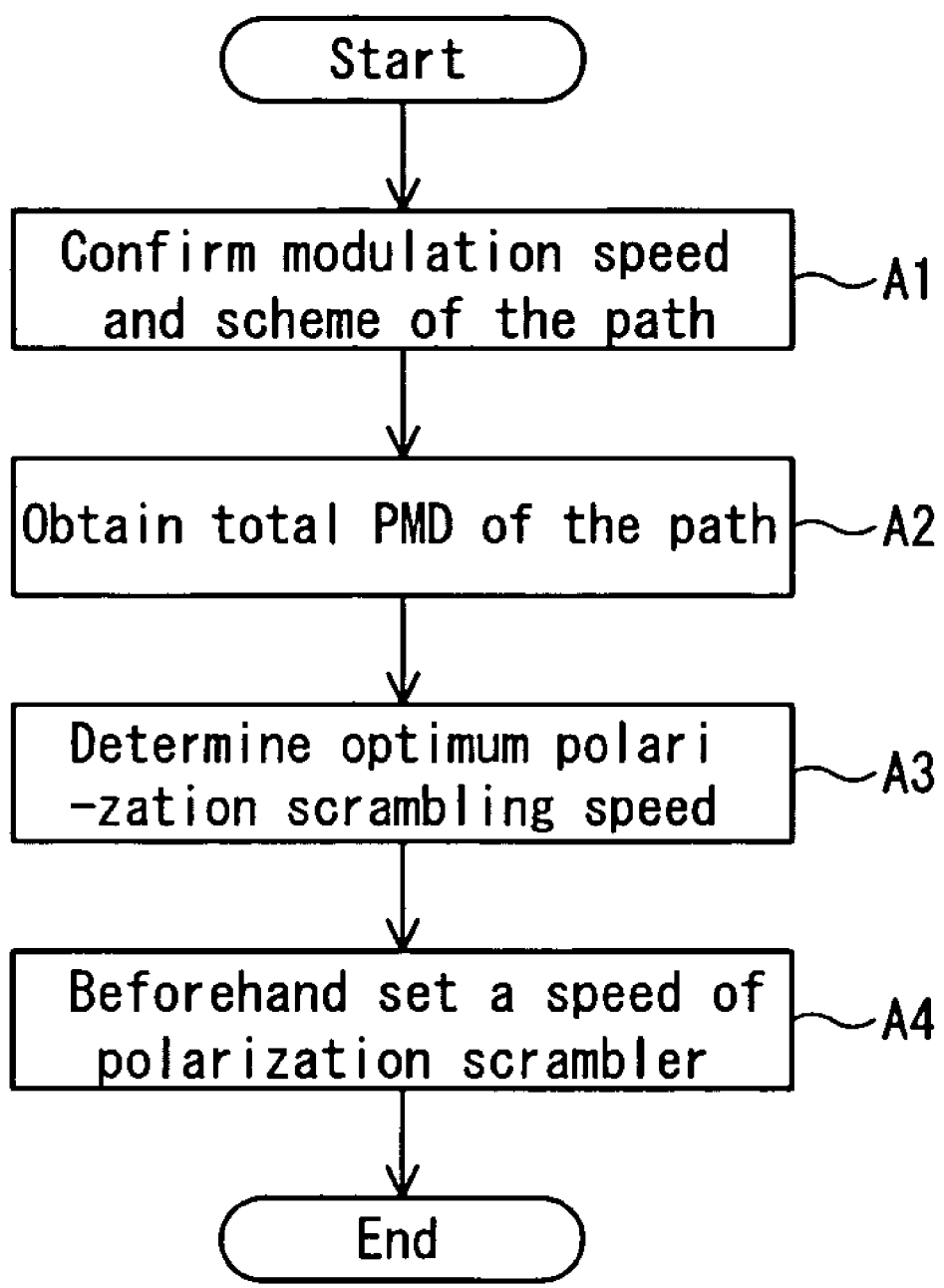
FIG. 9 is a flowchart for illustrating an operation of the polarization scrambler according to the first embodiment of this invention.

As shown in a flowchart in FIG. 9, in the polarization scrambler 1, the information receiving unit 4 in the polarization rotation controlling unit 3 obtains the modulation scheme and modulation speed of a path set at a relevant add port 111a and a value of PMD of this path (steps A1 and A2). The control signal outputting unit 6 refers to the speed table 5 on the basis of the modulation scheme and modulation speed, and the value of PMD obtained to acquire a polarization state rotation speed to be used by the polarization state rotating unit 2 (step A3). The control signal outputting unit 6 outputs a control signal in order to rotate the polarization state of the input signal light at the acquired polarization state rotation speed. The polarization state rotating unit 2 can do polarization rotation of the signal light according to a path set at the add port 111a (step A4).

According to the first embodiment of this invention, it is possible to implement optimum polarization scrambling on a signal inputted to an add port 111a of each of the OADM nodes 101 to 104 by the polarization scrambler 1 to suppress quality degradation caused by inappropriate speed of the polarization scrambling, which enables transmission of high transmission quality with the sufficient use of the effect of averaging of penalty due to PMD induced by polarization scrambling.

[A2] Description of First Modification of First Embodiment

Figure 10:
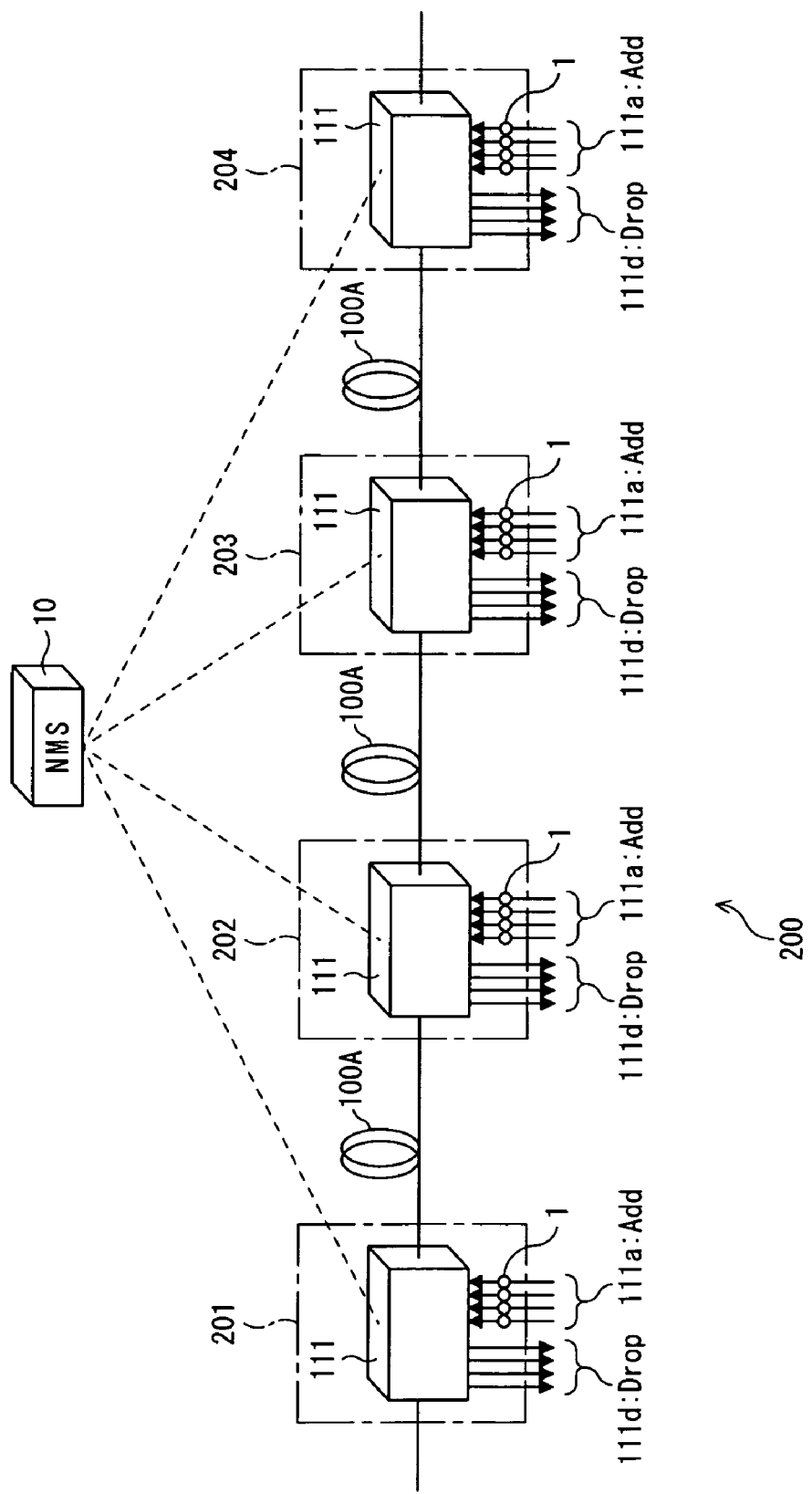
FIG. 10 is a diagram showing a modification of the first embodiment.

FIG. 10 is a diagram showing a wavelength division multiplexing transmission system 200 according to a first modification of the first embodiment of this invention. Each of OADM nodes 201 through 204 of the wavelength division multiplexing transmission system 200 has the add/drop function unit 111 and the polarization scramblers 1, like those according to the first embodiment.

The OADM nodes 201 to 204 differ from the OADM nodes 101 to 104 according to the first embodiment in that the rotation speed controlling unit 3 (refer to FIG. 1) of the polarization scrambler 1 disposed on a path of a relevant add port 111a receives setting information on the wavelength division multiplexing transmission system 200 from a managing apparatus 10 such as an NMS (Network Management System) or the like managing the wavelength division multiplexing transmission system 200 including the OADM nodes 201 to 204, and controls the speed at which the polarization state is rotated by the polarization state rotating unit 2 on the basis of the setting information on the wavelength division multiplexing transmission system 200.

The information receiving unit 4 in the rotation speed controlling unit 3 in the polarization scrambler 1 receives a modulation scheme and speed of a signal light, and a value of PMD of a path as the setting information on the path at a relevant add port 111a from the managing apparatus 10, and holds this information.

When the wavelength division multiplexing transmission system 200 is a dynamic OADM system, that is, a network which permits that what signal is transmitted on what path is dynamically changed with time, it is necessary to dynamically change, with time, the optimum polarization scrambling speed for a signal light propagated over the wavelength division multiplexing transmission system 200. To the contrary, in the modification shown in FIG. 10, since each of the polarization scramblers 1 receives setting information on a path at a relevant add port 111a from the managing apparatus 10, the polarization scrambler 1 can set the optimum polarization scrambling speed determined from the setting information.

Figure 11:
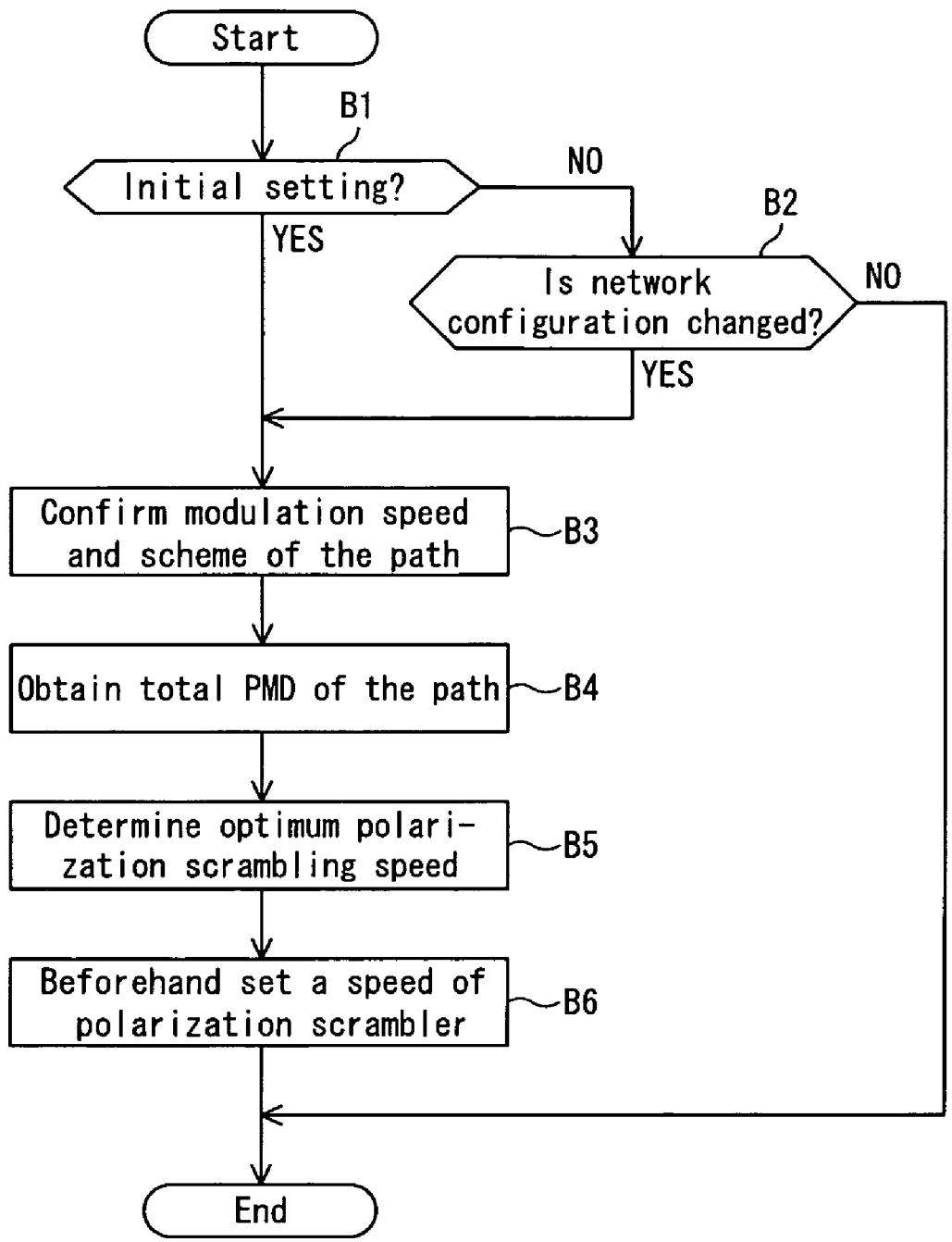
FIG. 11 is a flowchart for illustrating an operation of the modification of the first embodiment shown in FIG. 10.

As shown in a flowchart in FIG. 11, for example, when there occurs a change in path setting resulting in a change in network configuration (NO route at step B1, YES route at step B2), the polarization scrambler 1 disposed at a position of an add port of a relevant path receives path setting information with respect to this change from the managing apparatus 10 (steps B3 and B4). The rotation speed controlling unit 3 in the polarization scrambler 1 changes the rotation speed at which the polarization state is rotated by the polarization state rotating unit 2 to cope with the change in path setting and network configuration (steps B5 and B6).

[A3] Description of Second Modification of First Embodiment

Figure 12:
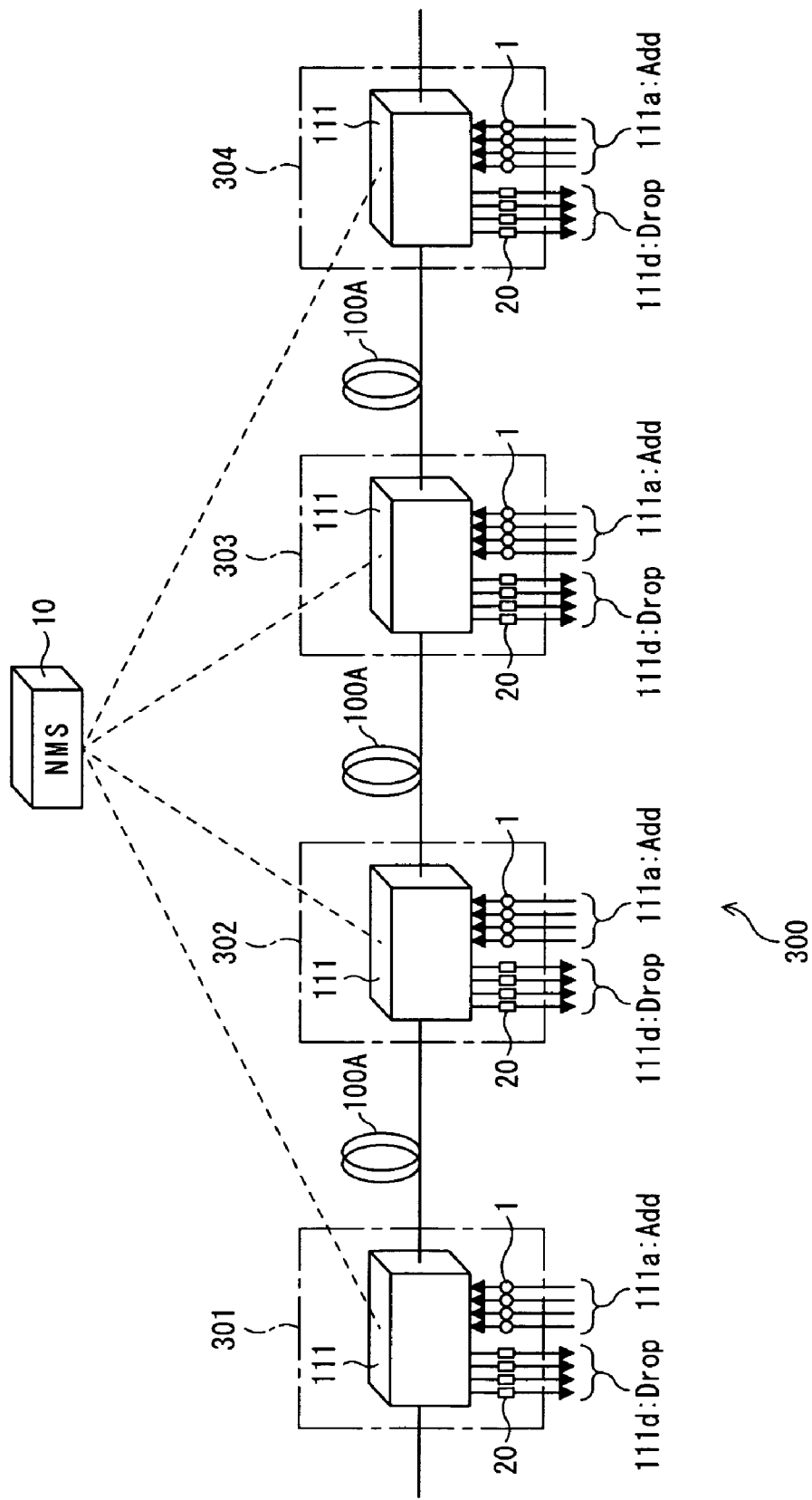
FIG. 12 is a diagram showing a modification of the first embodiment.

FIG. 12 is a diagram showing a wavelength division multiplexing transmission system 300 according to a second modification of the first embodiment of this invention. In the modification shown in FIG. 12, the wavelength division multiplexing transmission system 300 has the managing apparatus 10 managing the wavelength division multiplexing transmission system 300, and each of OADM nodes 301 to 304 of the wavelength division multiplexing transmission system 300 has the polarization scramblers 1 together with the add/drop function unit 111, like the modification shown in FIG. 10.

The OADM nodes 301 to 304 differ from the OADM nodes 201 to 204 shown in FIG. 10 in that a transmission quality monitor 20 is provided on a path at each of the drop ports 111d to monitor the transmission quality of a signal light outputted through the drop port 111d. In Correspondence with the polarization scrambler 1 disposed on a path of an add port 111a, the transmission quality monitor 20 is disposed on a path of a drop port 111d which is to drop the same path as the add port 111a but in the opposite direction.

As shown in FIG. 1, the control signal outputting unit 6 refers to the speed table 5 to obtain an optimum rotation speed to be used by the rotating unit 7, and supplies a control signal to the rotation driving unit 8 to set and control the rotation speed. Thereafter, the control signal outputting unit 6 gives a control signal to the rotation driving unit 8, using a result of monitoring by the transmission quality monitor 20 as a feedback element. Whereby, the rotation speed can be set more accurately.

In other words, the control signal outputting unit 6 captures a result of monitoring of the transmission quality of a signal light in a direction opposite to that of a signal light whose polarization state is to be rotated by the polarization scrambler 1 on its propagation path (path #1, #2, . . . or #6 in FIG. 8, for example) from the transmission quality monitor 20 disposed at a relevant drop port 111d. The control signal outputting unit 6 outputs a control signal to the rotation driving unit 8, using the result of monitoring as a feedback element.

Since the sine wave period of the control signal to the rotation driving unit 8 is reflected in the rotation speed to be used by the rotating unit 7, the control signal outputting unit 6 changes the sine wave period of the control signal to the rotation driving unit 8 on the basis of a result of monitoring by the transmission quality monitor 20 so that the transmission quality is improved.

In the meantime, the information receiving unit 4 can receive, from the managing apparatus 1, information about a drop port 111*d*, which has the same path as an add port 111*a* at which the polarization scrambler 1 is disposed but is to drop a signal light in the opposite direction, that is, information about a combination of an add port 111*a* and a drop port 111*d*, which are a pair for the feedback control and to which the polarization scrambler 1 and the transmission quality monitor 20 are disposed. The information receiving unit 4 holds this information.

Accordingly, the control signal outputting unit 6 in the rotation speed controlling unit 3 has a function as a monitoring result obtaining unit for obtaining a result of monitoring as to the signal optical transmission quality of a transmission path on which an input signal light is to be transmitted, as a result of monitoring from the transmission quality monitor 20, on the basis of setting information on the network from the managing apparatus 10, and also has a function as a feedback controlling unit for feedback-controlling a speed at which the polarization state is to be rotated on the basis of a result of monitoring by the transmission quality monitor 20.

Figure 13:
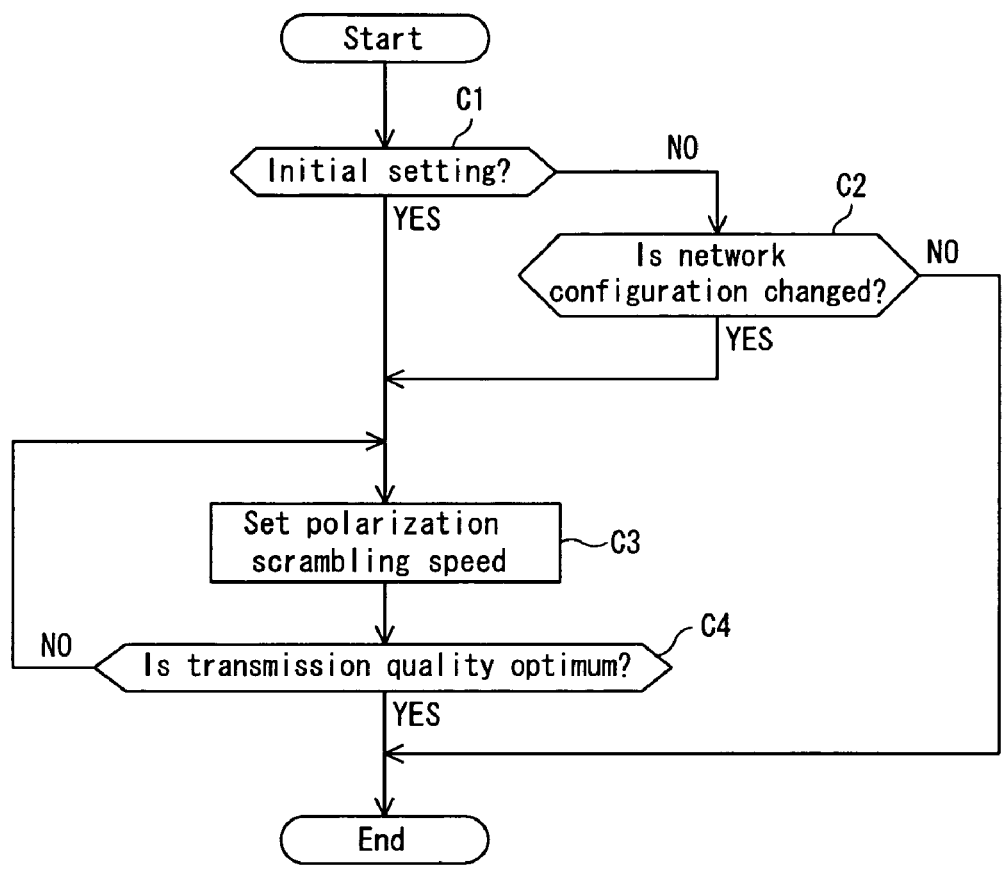
FIG. 13 is a flowchart for illustrating an operation of the modification of the first embodiment shown in FIG. 12.

As shown in a flowchart in FIG. 13, for example, in each of the OADM nodes 301 to 304 structured as above, when there occurs a change in path setting resulting in a change in network configuration (NO route at step C1, YES route at step C2), or when the polarization state rotating unit 2 is in rotating operation at a rotation speed set in the initial setting, the control signal outputting unit 6 in the polarization scrambler 1 disposed at the add port 111*a* captures a result of monitoring by the transmission quality monitor 20 to obtain a result of monitoring of the signal optical transmission quality of a transmission path on which an input signal light is to be transmitted. The control signal outputting unit 6 appropriately adjusts the sine wave frequency of a control signal to the rotation driving unit 8 on the basis of the obtained result of monitoring to feedback-control the polarization rotation speed so that the transmission quality is optimum (steps C3 and C4).

As above, this modification can not only provide the same advantages as the first embodiment and the first modification mentioned above, but also control the polarization rotation speed so that the transmission quality is favorable.

Meanwhile, capturing of a result of monitoring as a feedback element from the transmission quality monitor 20 may be always implemented, or implemented only when a change in network configuration occurs.

[B1] Description of Second Embodiment

Figure 14:
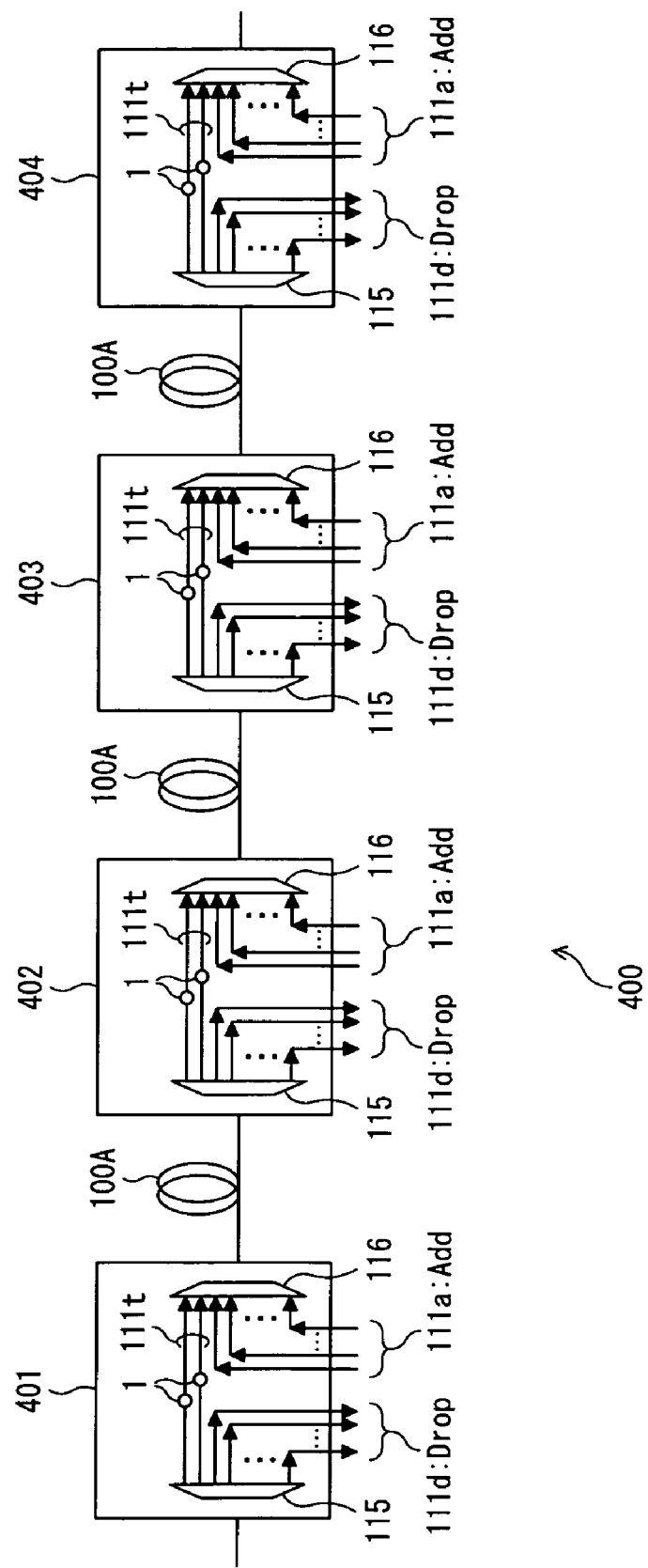
FIG. 14 is a diagram showing a wavelength division multiplexing optical transmission system according to a second embodiment of this invention.

FIG. 14 is a diagram showing a wavelength division multiplexing transmission system 400 where OADM nodes 401 to 404 as being optical add/drop multiplexers according to a second embodiment of this invention are disposed on the transmission path 100A. The second embodiment differs from the first embodiment in that the polarization scrambler 1 similar to that described above with reference to FIG. 1 is disposed on not a path of the add port 111*a* but on a path of the through port 111*t* in each of the OADM nodes 401 to 404. Incidentally, the structure is basically the same as that according to the first embodiment excepting the position of the polarization scrambler 1.

Owing to the polarization scrambler 1 disposed on a path of each of the through ports 111*t*, it is possible to scramble the polarization state of a signal light on a path passing through the through port 111*t* in each of the OADM node 401 to 404 in the wavelength division multiplexing transmission system 400 by setting the rotation speed according to the pass assigned to a certain wavelength. It is further possible to set the rotation speed at which the transmission quality of the signal light is optimized according to the modulation scheme and speed of the path and the value of PMD of the path.

Figure 15:
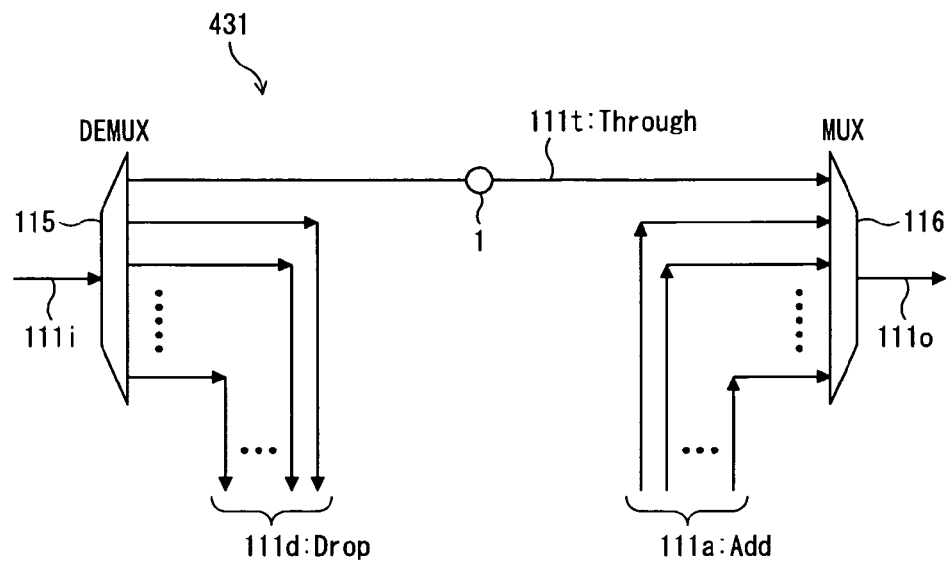
FIG. 15 is a diagram showing an OADM node (optical add/drop multiplexer) according to the second embodiment of this invention.
Figure 16:
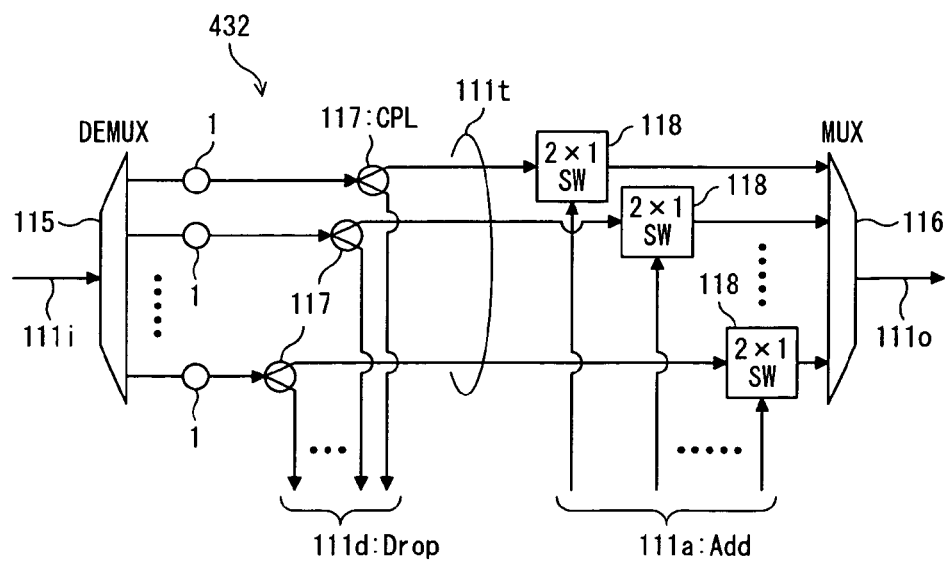
FIGS. 16 through 19 are diagrams showing modifications of the OADM node (optical add/drop multiplexer) according to the second embodiment of this invention.

FIG. 15 is a diagram for illustrating a structure of each of the OADM nodes 401 to 404. An OADM nodes 431 shown in FIG. 15 has an add/drop function unit (refer to reference character 111A) comprising a DEMUX unit 115 and a MUX unit 116 similar to those described above with reference to FIG. 4, and a polarization scrambler 1 at a position of the through port 111*t*. In the OADM node 431 structured as above, the polarization scrambler 1 disposed at a position of the through port 111*t* can do polarization scrambling according to the path to optimize the transmission quality of the path.

FIGS. 16 through 19 show modifications of the structure of the OADM nodes 401 to 404. An OADM node 432 shown in FIG. 16 has polarization scramblers 1 each on a path before a wavelength component of a signal light demultiplexed by an optical DEMUX unit 115 is inputted to an optical coupler 117, together with a reconfigurable add/drop function unit (refer to reference character 111B in FIG. 5 and a reference characters 115 to 118 in FIG. 16 and FIG. 5) similar to that described above with reference FIG. 5.

Namely, the polarization scrambler 1 is disposed on a path leading to the through port 111*t* between the optical DEMUX unit 115 and the optical coupler 117 to rotate the polarization state of a signal light having a wavelength to be inputted to a 2×1 switch 118 through the through port 111*t*, like the first embodiment, whereby the transmission quality can be excellent.

Figure 17:
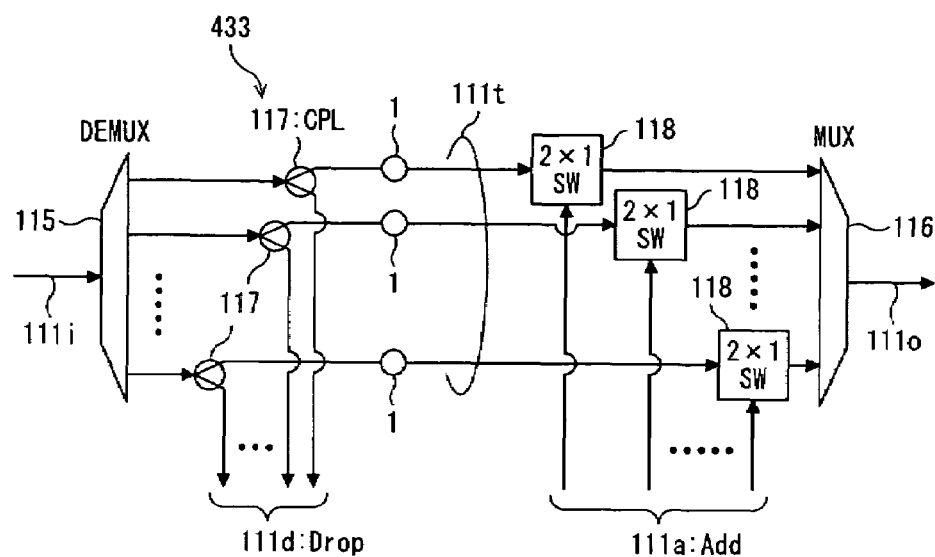
Figure 18:
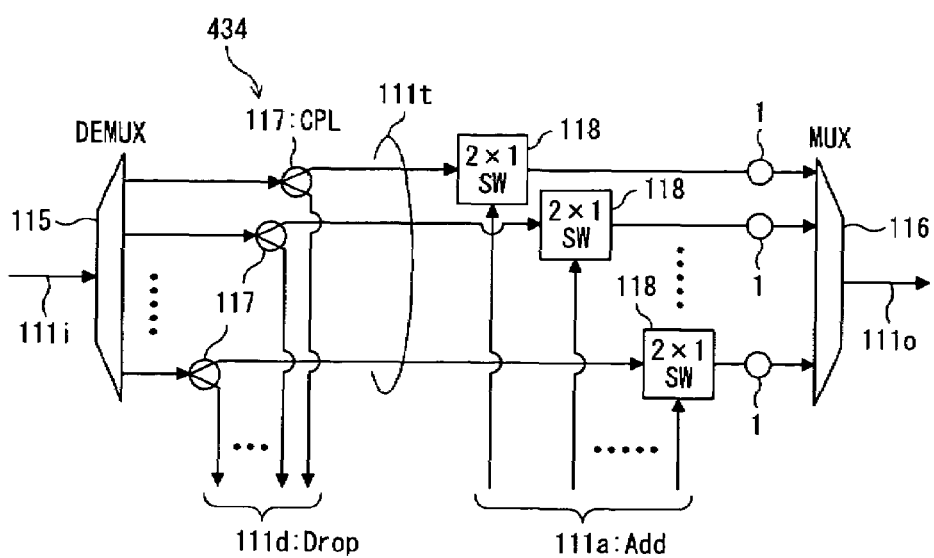

Each of OADM nodes 433 and 434 shown in FIGS. 17 and 18 has a reconfigurable add/drop function unit (refer to reference character 111B in FIG. 5 and reference characters 115 through 118 in FIG. 5, FIGS. 17 and 18) similar to that described above with reference to FIG. 5. The OADM node 433 shown in FIG. 17 has polarization scramblers 1 each at a position of a through port 111*t* between an optical coupler 117 and a 2×1 switch 118. The OADM node 434 shown in FIG. 18 has polarization scramblers 1 each at a position on a path from a through port 111*t* between the output of a 2×1 switch and a MUX unit 116.

In the OADM nodes 433 and 434 shown in FIGS. 17 and 18, the polarization scrambler 1 is disposed on a path of the through port 111*t* to rotate the polarization state of a signal light to be outputted from a transmission output port 111*o* through a MUX unit 116, like the first embodiment described above. Accordingly, it is possible to make the transmission quality excellent, like the first embodiment described above.

Figure 19:
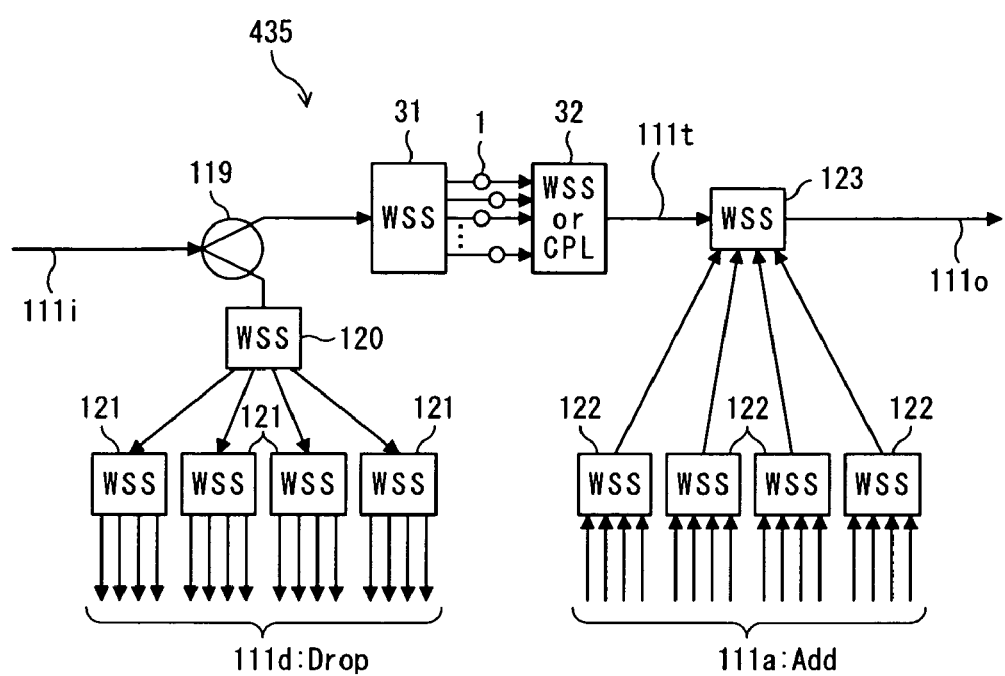

The OADM nodes 435 shown in FIG. 19 has an add/drop function unit (refer to a reference character 111D in FIG. 7 and reference characters 119 through 123 in FIGS. 7 and 19) as a D-OADM similar to that described above with reference to FIG. 7, and polarization scramblers 1 each on an optical path leading to a WSS 123 which constitutes a multiplexing unit for a signal light split by an optical coupler 119.

Incidentally, the signal light propagated on the optical path split by the optical coupler 119 has the same wavelength components as a signal light inputted to the transmission input port 111*i*, and these wavelength components are wavelength-division-multiplexed. Accordingly, the signal light split by the optical coupler 119 travels on a plurality of transmission paths having different PMD values. It is thus necessary to assume that wavelength components of the signal light have different modulation schemes and speeds. The OADM node 435 shown in FIG. 19 has a WSS 31 as a provisional demultiplexing unit which demultiplexes the signal light outputted from the optical coupler 119 in order to rotate the polarization state of each of wavelength components of the signal light, a plurality of polarization scramblers 1 each disposed on the output side of the WSS 31 to rotate the polarization states of a relevant wavelength component of the signal light demultiplexed by the WSS 31, and an optical coupler 32 as a combining unit for combining outputs from the plural polarization scramblers 1.

Each of the plural polarization scrambler 1 rotates the polarization state of a relevant wavelength component of the signal light at a rotation speed according to the modulation scheme and speed of the wavelength component and a value of PMD of a relevant optical transmission path, whereby the transmission quality of the signal light having its wavelength component can be improved. Instead of the WSS 31, it is possible to employ an optical demultiplexer having a function of demultiplexing a wavelength division multiplexed signal light into wavelength components. Further, instead of the optical coupler 32, it is possible to employ a WSS or an optical multiplexer to realize a function of combining lights having respective wavelength components.

According to the second embodiment of this invention, the polarization scrambler 1 can implement optimum polarization scrambling on a wavelength component of a signal light passing through a relevant through port 111*t* in each of the OADM nodes 401 to 404 to suppress degradation of the quality due to inappropriate polarization scrambling speed. This enables transmission of high transmission quality with the sufficient use of an effect of averaging penalty due to PMD induced by polarization scrambling.

[B2] Description of First Modification of Second Embodiment

Figure 20:
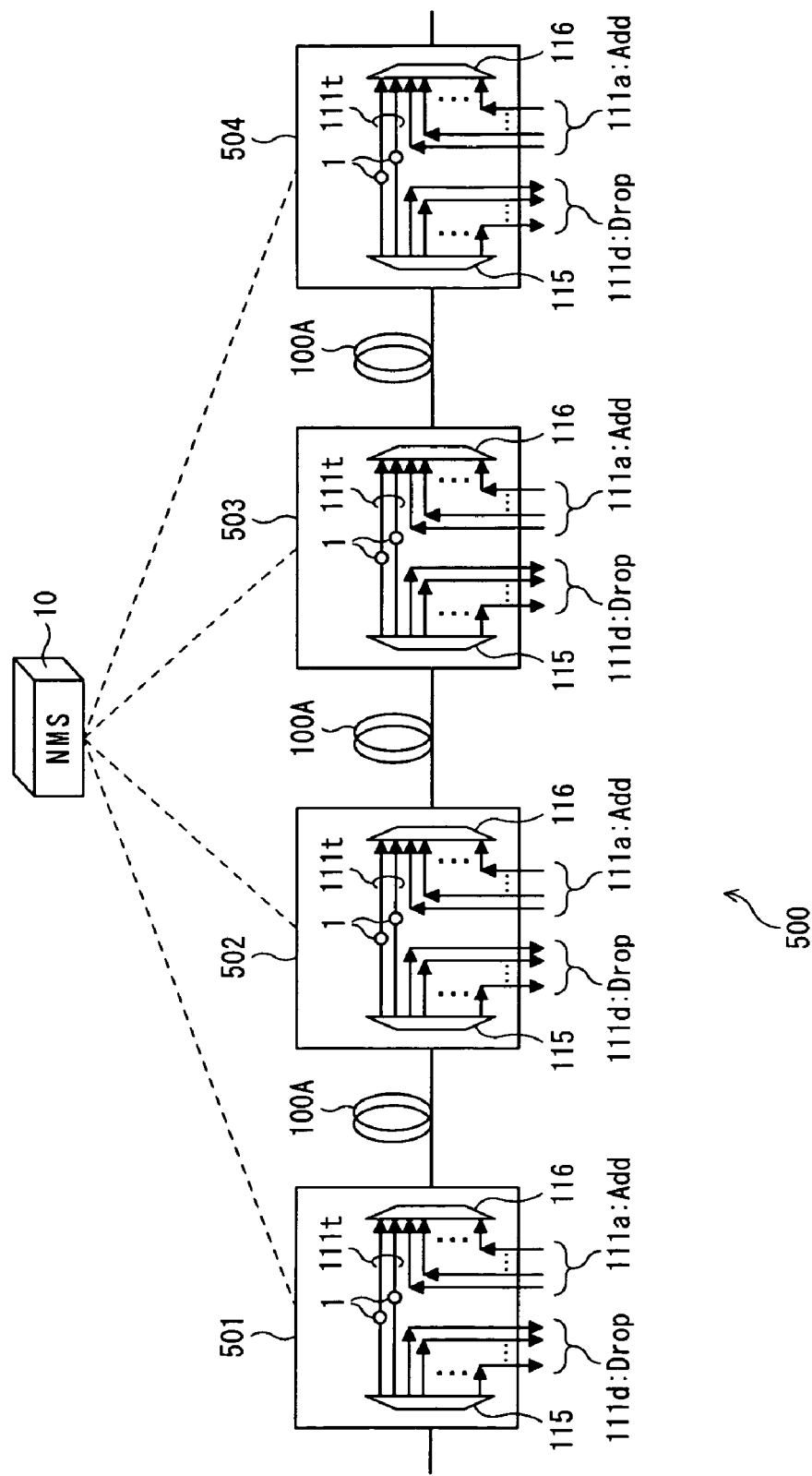
FIGS. 20 and 21 are diagrams showing modifications of the second embodiment.

FIG. 20 is a diagram showing a wavelength division multiplexing transmission system 500 according to a first modification of the second embodiment of this invention. Each of OADM nodes 501 to 504 in the wavelength division multiplexing transmission system 500 shown in FIG. 20 has a structure similar to that of the OADM nodes 401 to 404 in the second embodiment.

In each of the OADM nodes 501 to 504, the rotation speed controlling unit 3 (refer to FIG. 1) of a polarization scrambler 1 disposed on a path of a through port lilt receives setting information on the wavelength division multiplexing transmission system 500 from a managing apparatus 10 such as an NMS (Network management System) or the like managing the wavelength division multiplexing transmission system 500 including the OADM nodes 501 to 504, and controls a speed at which the polarization state is to be rotated by the polarization state rotating unit 2 on the basis of the setting information on the wavelength division multiplexing transmission system 500, like the first modification of the first embodiment.

The information receiving unit 4 in the rotation speed controlling unit 3 in the polarization scrambler 1 receives information on the modulation scheme and speed of a signal light and a value of PMD of a path from the managing apparatus 10 as the setting information on the path at a relevant add port 111*a*, and holds this information.

When the wavelength division multiplexing transmission system 500 is a dynamic OADM system, that is, a network permitting that what signal is transmitted on what path is dynamically changed with time, it is necessary to dynamically change with time the optimum polarization scrambling speed for a signal light propagated over the wavelength division multiplexing transmission system 500. In the modification shown in FIG. 20, since the polarization scrambler 1 receives setting information on a path at a relevant add port 111*a* from the managing apparatus 10, each of the polarization scramblers 1 can set an optimum polarization scrambling speed determined on the basis of this setting information.

[B3] Description of Second Modification of Second Embodiment

Figure 21:
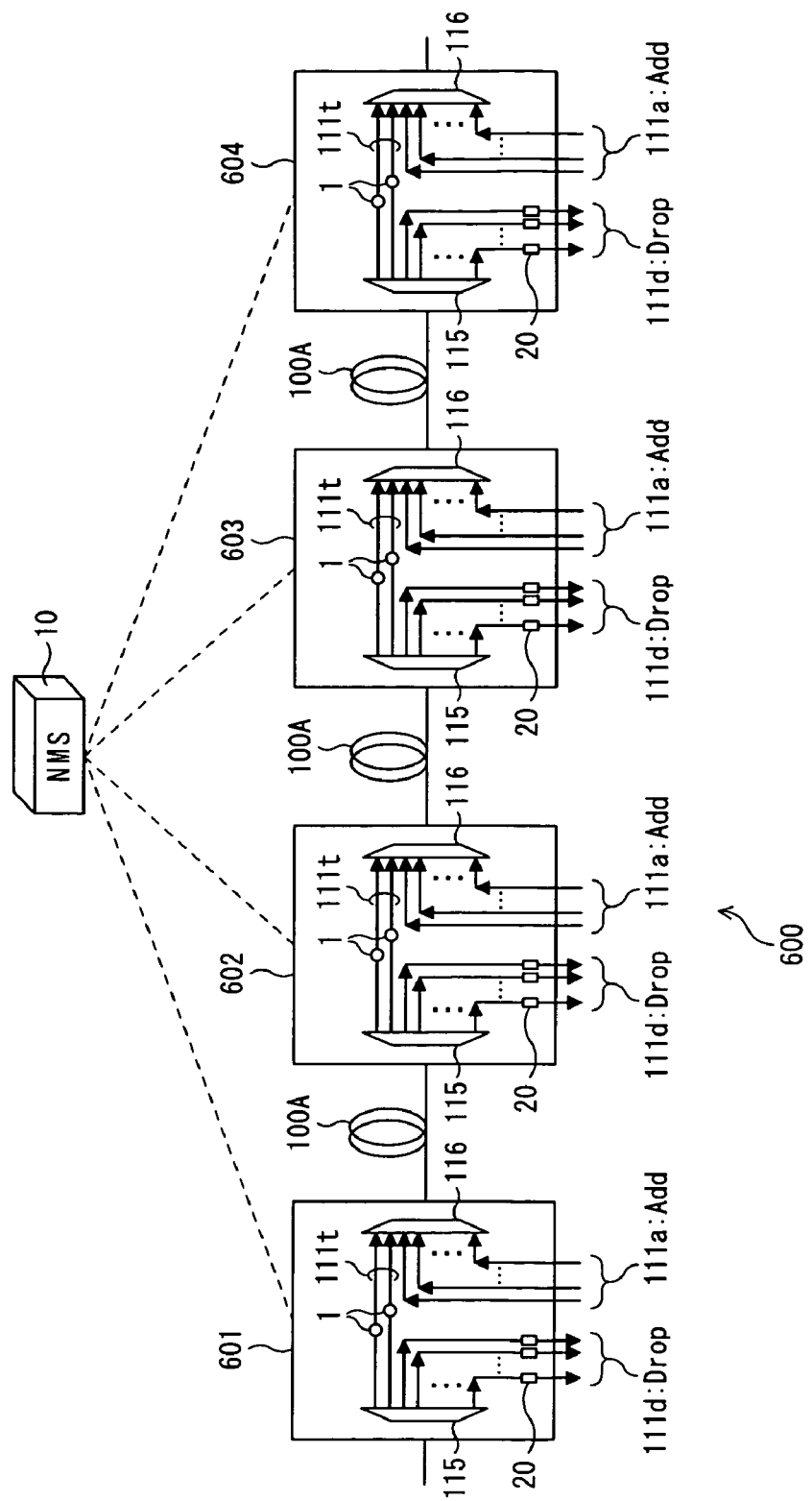

FIG. 21 is a diagram showing a wavelength division multiplexing transmission system 600 according to a second modification of the second embodiment of this invention. In the modification shown in FIG. 21, there is provided a managing apparatus 10 managing the wavelength division multiplexing transmission system 600 like the modification shown in FIG. 20, and each of OADM nodes 601 to 604 constituting the wavelength division multiplexing transmission system 600 has a structure similar to that of the OADM nodes 401 to 404 in the second embodiment.

Unlike the OADM nodes 501 to 504 described above with reference to FIG. 20, each of the OADM modes 601 to 604 has transmission quality monitors 20 similar to that shown in FIG. 20, each of which is disposed on a path of a relevant drop port 111*d*. Each of the transmission quality monitors 20 monitors the transmission quality of a signal light outputted through a relevant drop port 111*d*. The transmission quality monitor 20 is disposed at a position of a port which drops a signal light on the same path as a relevant through port 111*t* but in the opposite direction, correspondingly to the polarization scrambler 1 disposed on this through port 111*t*.

As shown in FIG. 1, the control signal outputting unit 6 refers to the speed table 5 to obtain an optimum rotation speed to be used by the rotating unit 7, and supplies a control signal to the rotation driving unit 8 to set and control the rotation speed. Thereafter, the control signal outputting unit 6 gives a control signal to the rotation driving unit 8, using a result of monitoring by the transmission quality monitor 20 as a feedback element. Whereby, it is possible to set the rotation speed more accurately.

The control signal outputting unit 6 captures a result of monitoring of the transmission quality of a drop light from the transmission quality monitor 20 equipped to the drop port 111*d*, and outputs a control signal to the rotation driving unit 8 by using a result of this monitoring as a feedback element. Since the sine wave period of the control signal to the rotation driving unit 8 is reflected in the rotation speed to be used by the rotation driving unit 8, the control signal outputting unit 6 changes the sine wave period of the control signal to the rotation driving unit 8 on the basis of a result of monitoring by the transmission quality monitor 20 so that the transmission quality is improved.

The drop light from which a result of monitoring of the transmission quality is captured may be selectively switched according to a notice from the managing apparatus 10.

Accordingly, the control signal outputting unit 6 in the rotation speed controlling unit 3 has a function as a monitoring result obtaining unit for obtaining a result of monitoring from the transmission quality monitor unit 20 on the basis of setting information on the network supplied from the managing apparatus 10, and a function as a feedback controlling unit for performing feedback control on a speed at which the polarization state is rotated on the basis of a result of monitoring by the transmission quality monitor 20.

In each of the OADM nodes 601 to 604, when a change in network configuration occurs due to a change in setting of a path or when the polarization state rotating unit 2 in the polarization scrambler 1 disposed at a relevant through port lilt operates at a rotation speed set in the initial setting, the control signal outputting unit 6 in this polarization scrambler 1 captures a monitoring result from the transmission quality monitor 20 to obtain the same. Further, the control signal outputting unit 6 appropriately adjusts the sine wave frequency of the control signal fed to the rotation driving unit 8 on the basis of the obtained monitoring result, and feedback-controls the polarization rotation speed so that the transmission quality is optimized.

As above, this modification can not only provide the same advantages as the second embodiment and the first modification of the second embodiment, but also control the polarization rotation speed so that the transmission quality is excellent.

Capturing of a result of monitoring from the transmission quality monitor 20 as a feedback element may be implemented always, or may be implemented only when a change in network configuration occurs.

[C] Description of Third Embodiment

Figure 22:
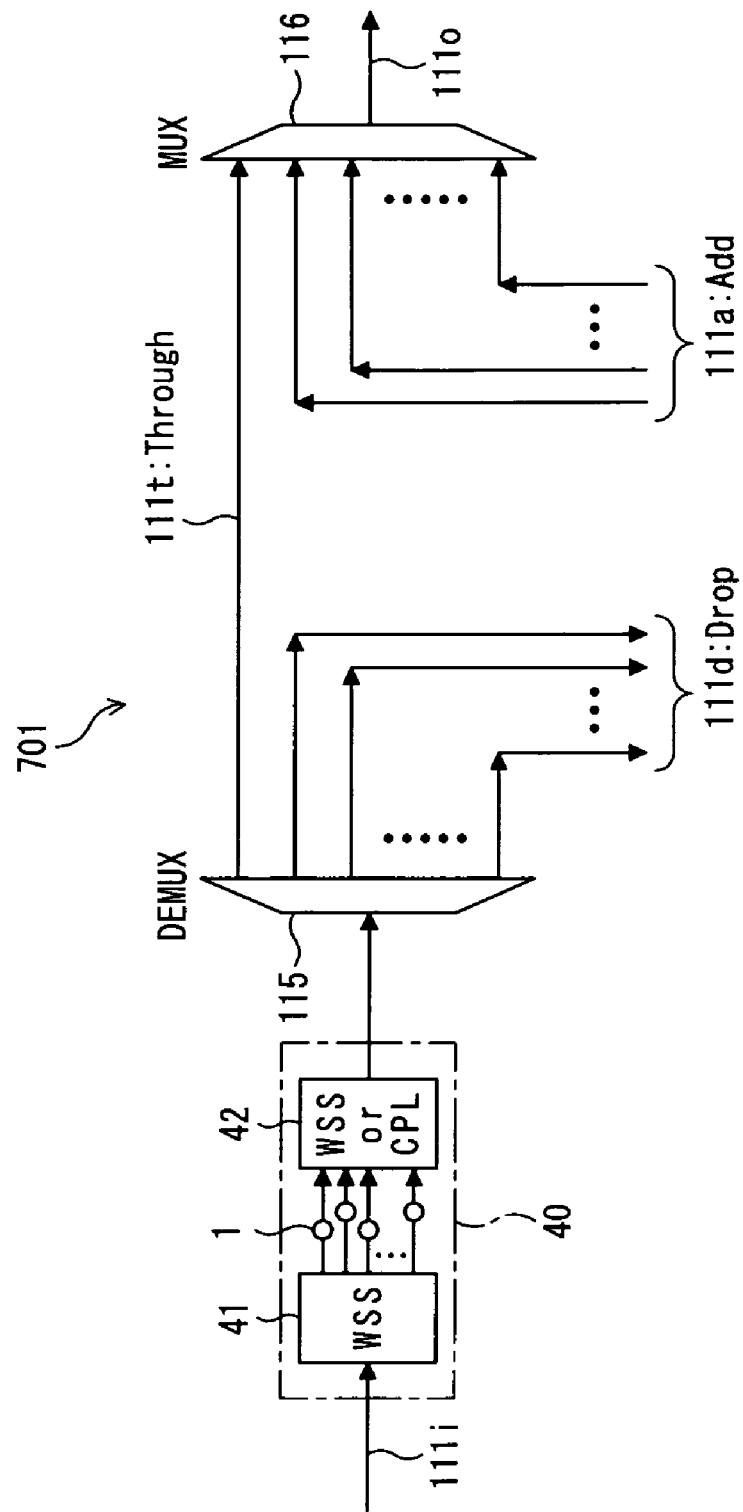
FIG. 22 is a diagram showing an OADM node (optical add/drop multiplexer) according to a third embodiment of this invention.

FIG. 22 is a diagram showing an OADM node 701 as an optical add/drop multiplexer according to a third embodiment of this invention. In the third embodiment, each of polarization scrambling apparatuses 40 is disposed at a position (on a path) of the transmission input port 111i of the OADM node 701, unlike the first and second embodiments.

The OADM node 701 shown in FIG. 22 has a structure (refer to reference character 111A) as an add/drop function unit comprised of a DEMUX unit 115 and a MUX unit 116 similar to those described above with reference to FIG. 4, and the above-mentioned polarization scrambling apparatuses 40 each at a position of the transmission input port 111i.

The polarization scrambling apparatus 40 comprises a WSS 41, at least one (plural in FIG. 22) polarization scrambler 1 having the structure described above with reference to FIG. 1, and an optical coupler 42. The WSS 41 is a provisional demultiplexing unit which demultiplexes a signal light to be inputted to the DEMXU unit 115 as being a demultiplexing unit in order to rotate the rotation state of each wavelength component. Instead of the WSS 41, it is possible to employ an optical demultiplexer which at least demultiplexes a signal light inputted to the transmission input port 111i into wavelength components.

Plural polarization scramblers 1 may be disposed at a plurality of output ports of the WSS 41, respectively, to rotate the polarization state of respective wavelength components of the signal light demultiplexed by the WSS 41. Incidentally, when the signal lights polarization-rotated by the respective polarization scramblers 1 are not combined, the optical coupler 42 couples the signal lights demultiplexed by WSS41 as they are. The optical coupler 42 is constituted as a combining unit for combining outputs from the plural polarization scramblers 1 and outputs the combined outputs to the DEMUX unit 115. A WSS or an optical multiplexer is employable instead of the optical coupler 42.

It is possible to set a rotation speed for each path assigned to a certain wavelength component of a signal light to scramble the polarization state of the wavelength component on the path passing through the transmission input port 111i by the polarization scrambler 1. Further, it is possible to set a rotation speed at which the transmission quality of the signal light is optimized according the modulation scheme and speed of the path and the value of PMD of the path, which improves the transmission quality of the signal light, like the first and second embodiments described above.

Figure 23:
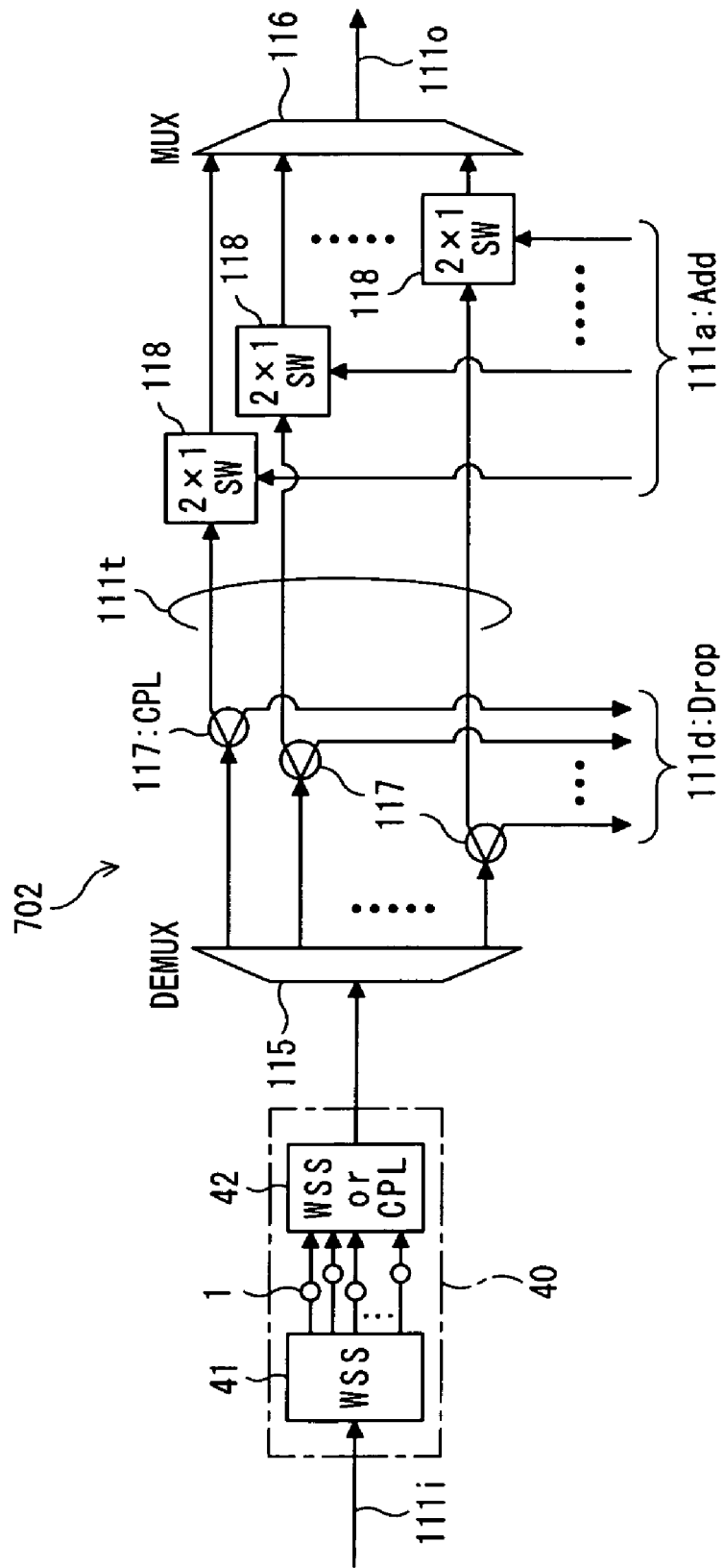
FIGS. 23 and 24 are diagrams showing modifications of the OADM node (optical add/drop multiplexer) according to the third embodiment of this invention.

The structure in which the polarization scrambling apparatus 40 is disposed at a position of the transmission input port 111i may be applied to an OADM node 702 having a reconfigurable optical add/drop function (R-OADM function), as shown in FIG. 23. The OADM node 702 shown in FIG. 23 has a structure (refer to reference character 111B in FIG. 5 and reference characters 115 through 118 in FIG. 5 and 23) as a reconfigurable add/drop function unit similar to that described above with reference to FIG. 5, and a polarization scrambling apparatus 40 similar to that shown in FIG. 22.

Figure 24:
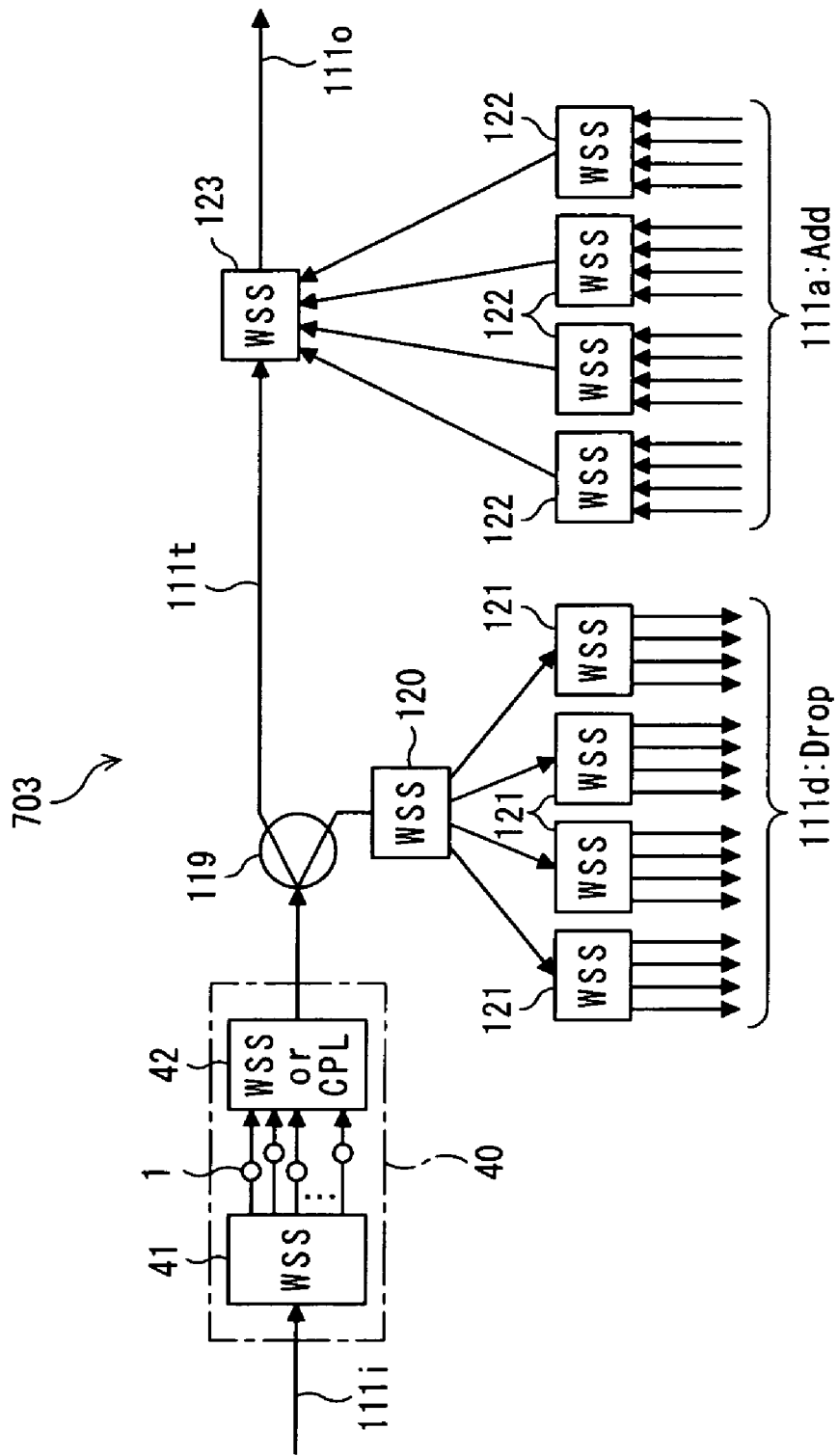

The structure having the polarization scrambling apparatus 40 at a position of the transmission input port 111i may be applied to an OADM node 703 having the D-OADM function, as well, as shown in FIG. 24. The OADM node 703 shown in FIG. 24 has a structure (refer to reference character 111D in FIG. 7 and reference characters 119 through 123 in FIGS. 7 and 24) of an add/drop function unit as a D-OADM similar to that described above with reference to FIG. 7, and a polarization scrambling apparatus 40 similar to that shown in FIG. 22.

[D] Description of Fourth Embodiment

Figure 25:
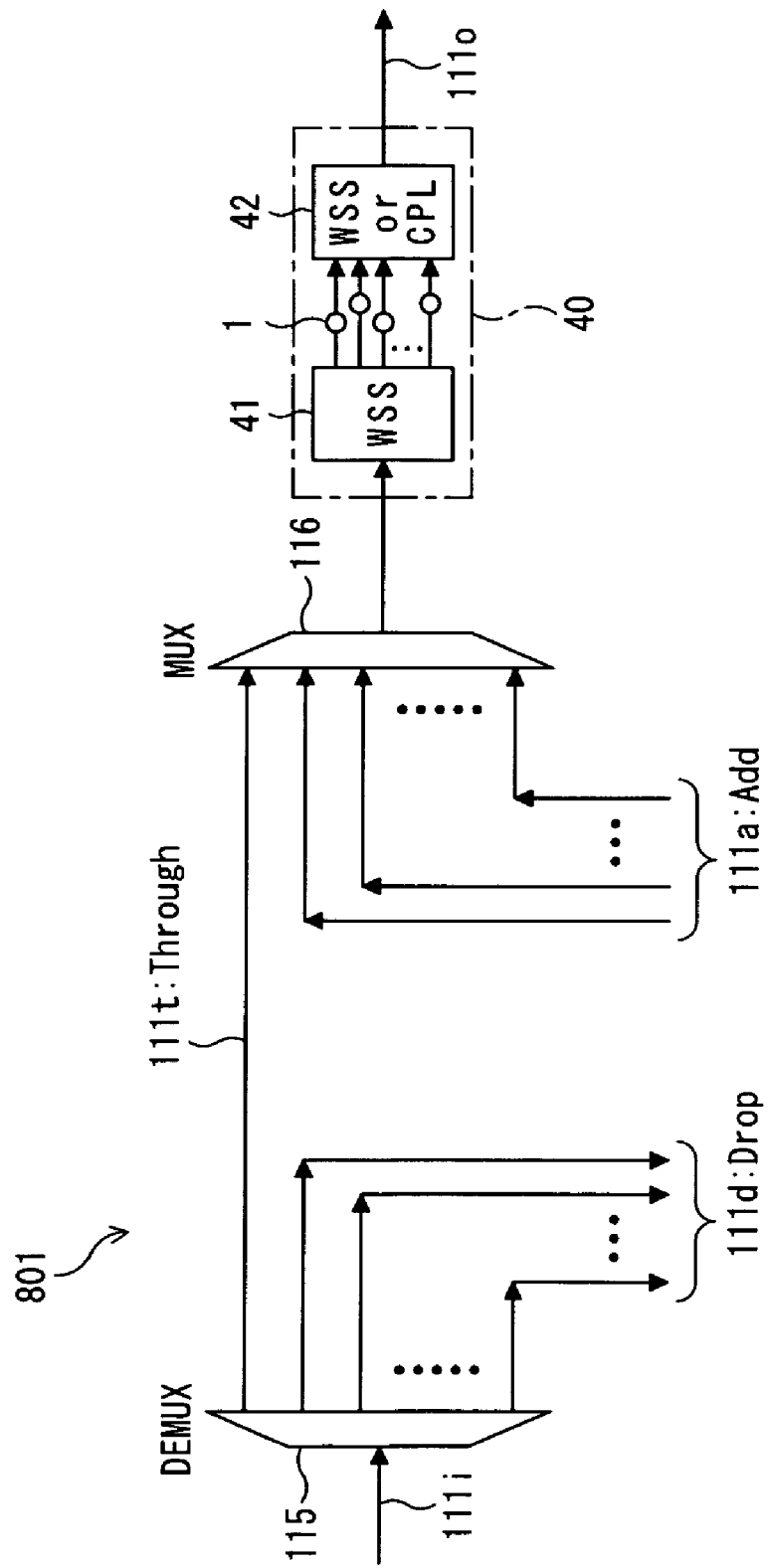
FIG. 25 is a diagram showing an OADM node (optical add/drop multiplexer) according to a fourth embodiment of this invention.

FIG. 25 is a diagram showing an OADM node 801 as an optical add/drop multiplexer according to a fourth embodiment of this invention. In the fourth embodiment, a polarization scrambling apparatus 40 is disposed at a position (on a path) of a transmission output port 111o, unlike the OADM node 701 (refer to FIG. 22) according to the third embodiment.

The OADM node 801 shown in FIG. 25 has a structure (refer to reference character 111A) as the add/drop function unit comprised of a DEMUX unit 115 and a MUX unit 116 similar to those described above with reference to FIG. 4, and the polarization scrambling apparatus 40 at a position of the transmission output port 111o.

It is possible to set a rotation speed for each path assigned to a certain wavelength component of a signal light to scramble the polarization state of the wavelength component on the path passing through the transmission output port 111o by a polarization scrambler 1 (in the polarization scrambling apparatus 40) disposed on the path of the transmission output port 111o. Further, it is possible to set a rotation speed at which the transmission quality of the signal light is optimized according to the modulation scheme and speed of the path and a value of PMD of the path. Accordingly, the fourth embodiment can improve the transmission quality of the signal light, like the first to third embodiments described above.

Figure 26:
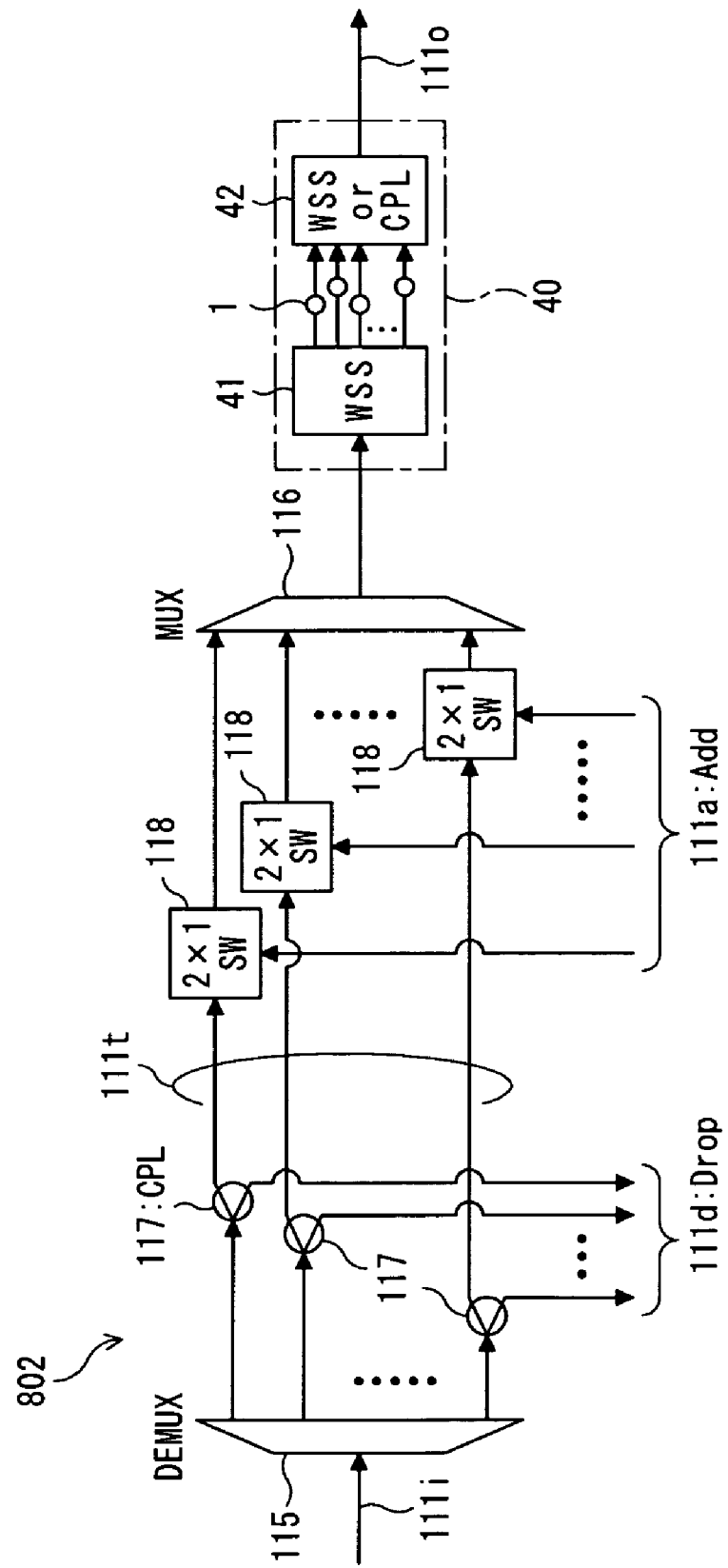
FIGS. 26 and 27 are diagrams showing modifications of the OADM node (optical add/drop multiplexer) according to the fourth embodiment of this invention.

The structure in which the polarization scrambling apparatus 40 is disposed at a position of the transmission output port 111o may be applied to an OADM node 802 having the reconfigurable optical add/drop function (R-OADM function), as shown in FIG. 26. The OADM node 802 shown in FIG. 26 has a structure as a reconfigurable add/drop function unit (refer to reference character 111B in FIG. 5 and reference characters 115 through 118 in FIGS. 5 and 23) similar to that described above with reference to FIG. 5, and the polarization scrambling apparatus 40 similar to that shown in FIG. 25.

Figure 27:
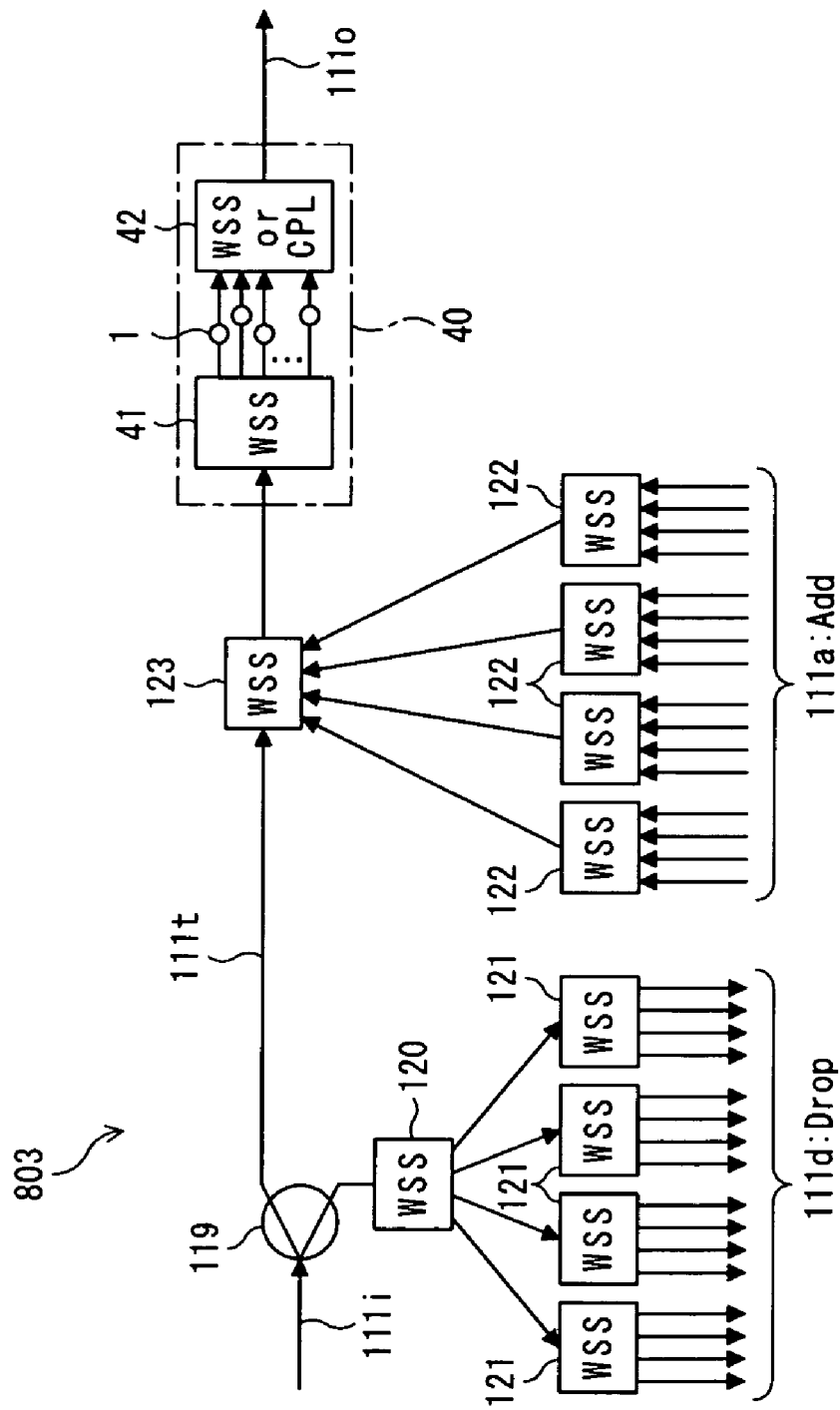

The structure in which the polarization scrambling apparatus 40 is disposed at a position of the transmission output port 111o may be applied to an OADM node 803 having the D-OADM function, as shown in FIG. 27. An OADM node 803 shown in FIG. 27 has a structure (refer to reference character 111D in FIG. 7 and reference characters 119 through 123 in FIGS. 7 and 27) on a D-OADM similar to that described above with reference to FIG. 7, and a polarization scrambling apparatus 40 similar to that shown in FIG. 25.

[E] Description of Fifth Embodiment

Figure 28:
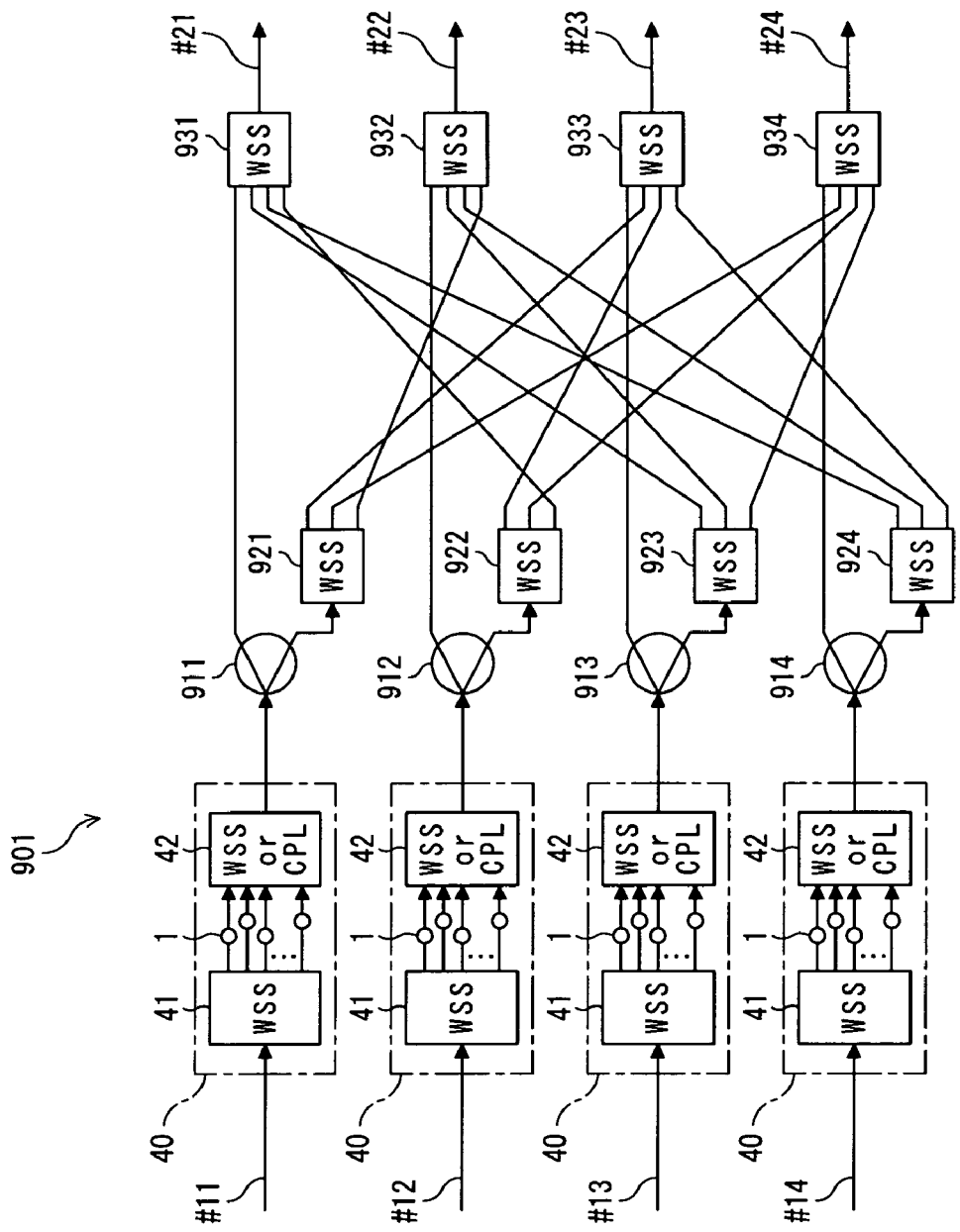
FIG. 28 is a diagram showing an optical route switching apparatus according to a fifth embodiment of this invention.

FIG. 28 is a block diagram showing an optical route switching apparatus (optical HUB) 901 according to a fifth embodiment of this invention. The optical route switching apparatus 901 shown in FIG. 28 has a plurality (four in FIG. 28) of input ports #11 to #14 and a plurality (four in FIG. 28) of output ports #21 to #24. In the optical route switching apparatus 901, the route of each of wavelength components of a wavelength division multiplexed signal light inputted to each of the input ports is selectively switched among the plural output ports, and wavelength components directed to each of the output ports #21 to #24 are combined into a wavelength division multiplexed signal and outputted.

In the optical route switching apparatus 901 according to the fifth embodiment, at least one polarization scrambling apparatus 40 (one for each input port, totaling four in the fifth embodiment), which rotates the polarization state of each wavelength component of a wavelength division multiplexed signal light, is disposed at a position of the input port of the optical route switching apparatus 901 to rotate the polarization state of each wavelength component of the wavelength division multiplexed signal light inputted to the optical route switching apparatus 901. As this, the polarization state of the wavelength division multiplexed signal light inputted to the optical route switching apparatus 901 can be rotated.

The polarization scrambling apparatus 40 disposed at a position of the input port of the optical route switching apparatus 901 is basically the same as that according to the third embodiment. Namely, at a position of the input port of the optical route switching apparatus 901, disposed are polarization scramblers 1 (refer to FIG. 1) each having the same structure as that according to the first embodiment as structural elements.

Each of optical couplers 911 to 914 disposed correspondingly to positions of the respective input ports splits a wavelength division multiplexed signal light inputted through the input port into two. In the optical route switching apparatus 901 shown in FIG. 28, the polarization state of each wavelength component of a wavelength division multiplexed signal light inputted to each of the input ports is rotated by the polarization scrambling apparatus 40 disposed at a position of the input port.

Each of WSS 921 to 924 demultiplexes one of the wavelength division multiplexed signal lights split into two by the corresponding optical coupler 911, 912, . . . , or 914, and selectively switches the route to one of a plurality (three in this case) of routes leading to an output port excepting the opposite output port to output the demultiplexed wavelength component.

For example, the WSS 921 demultiplexing a light from the input port #11 selectively switches the output route to any one of the output ports #22 to "24 excepting the opposite output port #21, and outputs the wavelength component of the light. Similarly, each of the WSS 922 to 924 demultiplexing a light from a corresponding input port #12, #14 or #14 selectively switches the output route to any one of three output ports excepting its opposite output port #22, #23 or #24, and outputs the wavelength component of the light.

Each of the WSS 931, 932, 933 and 934, whose output port is related to the output port #21, #22, #23 or #24, is inputted thereto a split light of a wavelength division multiplexed optical signal from the opposite input port #11, #12, #13 or #14, and also inputted thereto signal lights from three WSSs, each of which demultiplexes a wavelength division multiplexed signal light fed from a corresponding input port, selects signal lights to be outputted through the output port #21, #22, #23 or #24 of the inputted signal lights, and outputs them.

For example, the WSS 931 whose output is related to the output port #21 is inputted a split light of the wavelength division multiplexed signal light from the opposite input port #11 through the optical coupler 911 and is also inputted thereto signal lights from three WSSs 922 to 924 excepting the opposite input port #11, each of which demultiplexes a wavelength division multiplexed signal light from a corresponding input port #12, #13 or #14, selectively switches a signal light to be outputted from the output port #21 among the inputted signal lights, and outputs the signal light.

In the optical route switching apparatus 901 structured as above, with respect to a wavelength division multiplexed signal light inputted from each of the input ports #11 to #14, the route of each wavelength component of the wavelength division multiplexed signal light can be selectively switched to any one of the plural output ports #21 to "24, and the wavelength components can be multiplexed in each of the output ports #21 to #24 and outputted therefrom.

At this time, the polarization scrambling apparatus 40 disposed on a path of each of the four input ports #11 to #14, that is, the polarization scrambler 1 as being a structural element in the polarization scrambling apparatus 40, rotates the polarization state of each wavelength component of the signal light inputted to the input port by setting the rotation speed for the wavelength component, and the rotation speed at which the transmission quality is optimum is set according to the modulation scheme and speed of the wavelength component, and a value of PMD of the path. This can realize improvement of the transmission quality of the signal light.

According to the fifth embodiment of this invention, the polarization scrambler 1 can set the rotation speed at which the transmission quality of the signal light is optimum according to the modulation scheme and speed of a relevant wavelength component, and the value of PMD of the path, which enables improvement of the transmission quality of the signal light.

Figure 29:
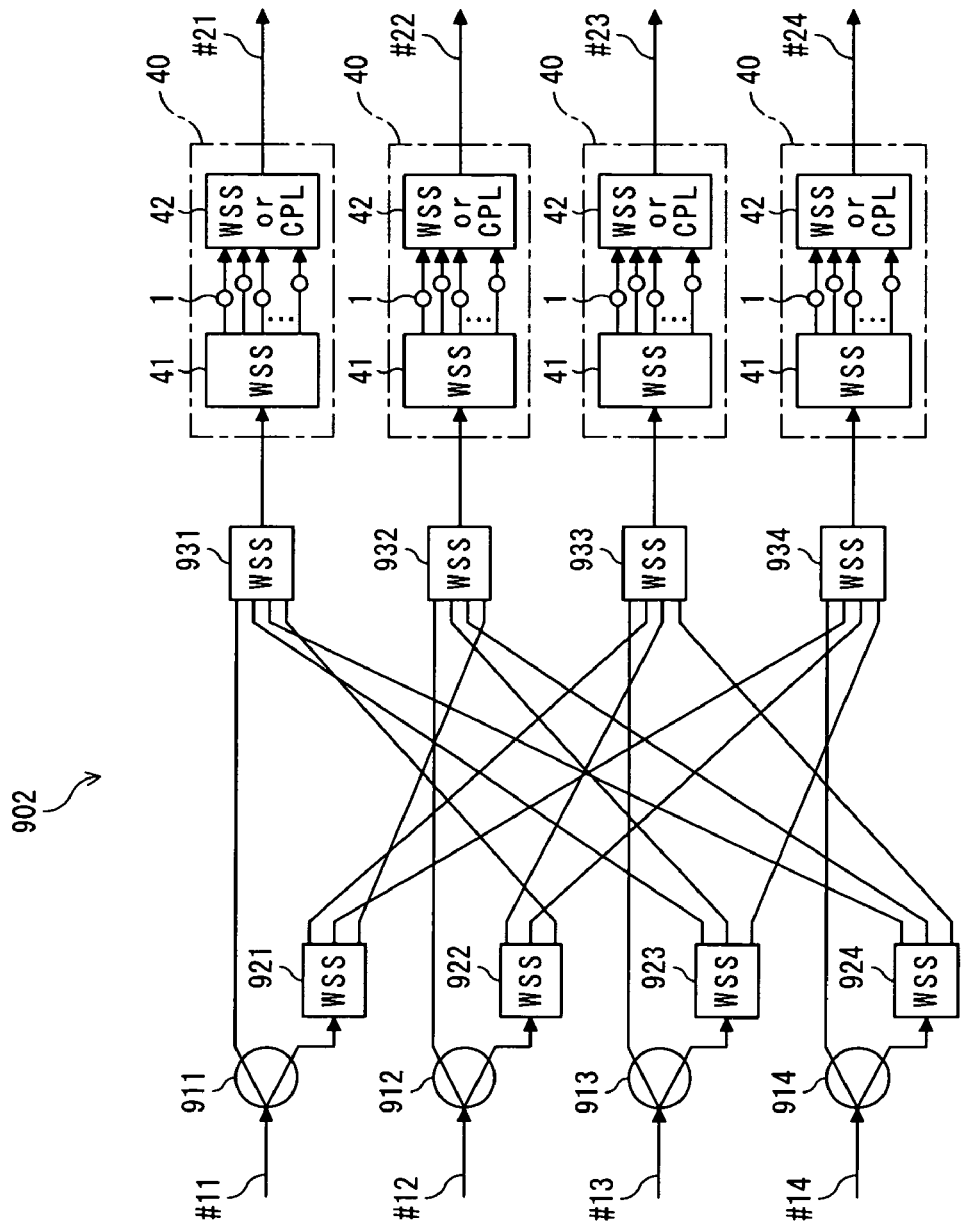
FIG. 29 is a diagram showing a modification of the optical route switching apparatus according to the fifth embodiment of this invention.

In the optical route switching apparatus 901 according to the fifth embodiment, there are provided four polarization scrambling apparatuses 40, each of which rotates the polarization state of each wavelength component of the wavelength division multiplexed signal light, at positions of the input ports #11 to #14 of the optical route switching apparatus 901, respectively. According to this invention, as shown in FIG. 29, the polarization scrambling apparatuses 40 totaling four may be disposed at respective output ports #21 to #24 in an optical route switching apparatus 902. Even such structure may provide the similar advantages to those provided by the fifth embodiment. The optical route switching apparatus 902 shown in FIG. 29 has optical couplers 911 to 914, WSSs 921 to 924 and WSSs 931 to 934 similar to those of the optical path switching apparatus shown in FIG. 28.

In the optical route switching apparatuses 901 and 902 shown in FIGS. 28 and 29, there are provided four input ports and four output ports. However, according to this invention, the numbers of the input ports and the output ports of the optical route switching apparatus are not limited to the above examples.

[F] Others

Note that the present invention is not limited to the above embodiments and their modifications, but may be practiced while being variously modified without departing from the spirit and scope of the present invention.

For example, the DEMUX unit 115 and the MUX unit 116, which are constitutional elements of the OADM node, may be configured with WSSs in each of the above embodiments.

The disclosure of the prevent invention allows persons skilled in the art to which the invention pertains to manufacture the apparatuses according to this invention.

What is claimed is:

1. A polarization scrambler comprising:
    a polarization state rotating unit for rotating a polarization state of a signal light; and
    a rotation speed controlling unit for controlling a rotation speed of the polarization state in said polarization state rotating unit on the basis of a speed and scheme of modulation of the signal light and a value of polarization mode dispersion of a transmission path on which the signal light is to be transmitted.

2. The polarization scrambler according to claim 1, wherein said rotation speed controlling unit comprises:
    an information receiving unit for receiving information on the speed and scheme of modulation of the signal light and the value of polarization mode dispersion of the transmission path on which the signal light is to be transmitted;
    a speed table for holding rotation speed information at which the polarization state is to be rotated according to a combination of the speed and scheme of modulation of the signal light and the value of polarization mode dispersion of the transmission path on which the signal light is to be transmitted; and
    a control signal outputting unit for determining the rotation speed information at which the polarization state of the signal light is to be rotated by referring to said speed table on the basis of the combination of the speed and scheme of modulation of the signal light and the value of polarization mode dispersion of the transmission path on which the signal light is to be transmitted received by said information receiving unit, and outputting a control signal containing the rotation speed information to said polarization state rotating unit; and
    said polarization state rotating unit comprises:
        a rotating unit for rotating the polarization state of an input signal light on the basis of a drive signal; and
        a rotation driving unit for outputting the drive signal to said rotating unit in order to rotate the polarization state of the input signal light by said rotating unit according to the rotation speed information contained in the control signal supplied from said control signal outputting unit.

3. An optical add/drop multiplexer comprising:
    a demultiplexing unit for demultiplexing a signal light into wavelength components, and being able to output at least one of the wavelength components through a drop port;
    a multiplexing unit being able to be inputted thereto at least one of the demultiplexed wavelength components through a through port, multiplex the wavelength component inputted through the through port and at least one wavelength component inputted through an add port together into a wavelength division multiplexed signal light, and output the wavelength division multiplexed signal light; and
    at least one polarization scrambler for rotating a polarization state of a corresponding one of the wavelength components to be multiplexed together into the wavelength division multiplexed signal light by said multiplexing unit and to be outputted therethrough;
    said polarization scrambler comprising:
        a polarization state rotating unit for rotating the polarization state of the wavelength component to be outputted through said multiplexing unit; and
        a rotation speed controlling unit for controlling a rotation speed of the polarization state of the wavelength component in said polarization state rotating unit on the basis of a speed and scheme of modulation of the wavelength component and a value of polarization mode dispersion of a transmission path on which the wavelength component is to be transmitted.

4. The optical add/drop multiplexer according to claim 3, wherein said polarization scrambler is disposed on a path passing through said add port to rotate the polarization state of the wavelength component to be inputted to said multiplexing unit through said add port.

5. The optical add/drop multiplexer according to claim 4, wherein a plurality of said polarization scramblers are disposed on paths passing through a plurality of said add ports, respectively.

6. The optical add/drop multiplexer according to claim 5, wherein a plurality of said polarization scramblers are disposed, and said rotation speed controlling unit is shared by said plural polarization scramblers.

7. The optical add/drop multiplexer according to claim 3, wherein said polarization scrambler is disposed on a path passing through said through port to rotate the polarization state of the wavelength component to be inputted to said multiplexing unit through said through port.

8. The optical add/drop multiplexer according to claim 7, wherein a plurality of said polarization scrambler are disposed on paths passing through a plurality of said through ports, respectively.

9. The optical add/drop multiplexer according to claim 8, wherein a plurality of said polarization scramblers are disposed, and said rotation speed controlling unit is shared by said plural polarization scramblers.

10. The optical add/drop multiplexer according to claim 3 further comprising:
    a provisional demultiplexing unit for demultiplexing a signal light to be inputted to said demultiplexing unit into a plurality of output streams of respective wavelength components, said at least one polarization scrambler being disposed over one of the output streams from said provisional demultiplexing unit to rotate the polarization state of a corresponding wavelength component from said provisional demultiplexing unit; and
    a combining unit for combining the plural output streams and outputting the combined streams to said demultiplexing unit.

11. The optical add/drop multiplexer according to claim 10, wherein a plurality of said polarization scramblers are disposed, and said rotation speed controlling unit is shared by said plural polarization scramblers.

12. The optical add/drop multiplexer according to claim 3 further comprising:
    a provisional demultiplexing unit for demultiplexing a signal light outputted from said multiplexing unit into a plurality of output streams of respective wavelength components, said at least one polarization scrambler being disposed over one of the output streams from said provisional demultiplexing unit to rotate the polarization state of a corresponding wavelength component from said provisional demultipelxing unit; and a combining unit for combining the output streams and outputting the combined streams as an output light signal.

13. The optical add/drop multiplexer according to claim 12, wherein a plurality of said polarization scramblers are disposed, and said rotation speed controlling unit is shared by said plural polarization scramblers.

14. The optical add/drop multiplexer according to claim 3, wherein said rotation speed controlling unit receives setting information on a network including said optical add/drop multiplexer from a managing apparatus managing said network, and controls a speed at which the polarization state is to be rotated by said polarization state rotating unit on the basis of the setting information on said network.

15. The optical add/drop multiplexer according to claim 14 further comprising:
    a transmission quality monitor for monitoring transmission quality of the wavelength component outputted through said drop port; and
    said rotation speed controlling unit comprising:
        a monitoring result obtaining unit for obtaining a monitoring result from said transmission quality monitor on the basis of the setting information on said network from said managing apparatus; and
        a feedback controlling unit for feedback-controlling a rotation speed at which the polarization state is to be rotated on the basis of the monitoring result obtained by said transmission quality monitor.

16. The optical add/drop multiplexer according to claim 3, wherein said demultiplexing unit comprises:
    an optical DEMUX unit for demutliplexing a signal light into a plurality of wavelength components; and
    a plurality of distributing units each of which splits each of the plural wavelength components demultiplexed by said optical DEMUX unit into two, at least one of the two wavelength components split by said distributing unit being able to be outputted through a corresponding drop port; and
    said multiplexing unit comprises:
        a plurality of 2×1 switches disposed for the respective wavelength components, each of said 2×1 switches being inputted thereto the other one of the two wavelength components split by a corresponding one of said distributing units through a corresponding through port; and selectively outputting either the other wavelength component inputted through said through port or a wavelength component inputted through a corresponding add port; and
        an optical MUX unit being able to multiplex outputs from said plural 2×1 switches together into a wavelength division multiplexed signal light and output the wavelength division multiplexed signal light.

17. The optical add/drop multiplexer according to claim 3, wherein said demultiplexing unit comprises:
    a distributing unit for splitting a signal light into two signal lights; and
    a wavelength selective switch being able to demultiplex one of the two signal lights split by said distributing unit into wavelength components, arbitrarily select said drop port(s) as (an) output destination port(s) for the demultiplexed wavelength component(s), and output the wavelength component(s) through said drop port(s); and
    said multiplexing unit comprises:
        a wavelength selective switch inputted thereto the other one of the two signal lights split by said distributing unit through said through port, inputted thereto (a) wavelength component(s) through said add port(s), and being able to selectively output (an) arbitrary wavelength component(s) inputted from said through port and/or said add port(s).

18. An optical route switching apparatus having a plurality of input ports and a plurality of output ports, selectively directing a route of each of wavelength components of a wavelength division multiplexed signal light inputted from each of said plural input ports to an arbitrary one of said plural output ports, multiplexing wavelength components led to each of said output ports together into a wavelength division multiplexed signal light, and outputting the same from said output port, said optical route switching apparatus comprising:
    at least one polarization scrambling apparatus disposed at a position of at least one of said input ports or at least one of said output ports of said optical route switching apparatus, said polarization scrambling apparatus being able to rotate a polarization state of at least one wavelength component of the wavelength division multiplexed signal light;
    said polarization scrambling apparatus comprising:
        a provisional demultiplexing unit for demultiplexing the wavelength division multiplexed signal light into a plurality of output streams of respective wavelength components;
        at least one polarization scrambler disposed over one of the output streams, said polarization scrambler rotating the polarization state of a corresponding wavelength component of the signal light demultiplexed by said provisional demultiplexing unit; and
        a combining unit for combining the output streams;
    said polarization scrambler comprising:
        a polarization state rotating unit for rotating the polarization state of the wavelength component of the signal light from said provisional demultiplexing unit; and
        a rotation speed controlling unit for controlling a rotation speed of the polarization state of the wavelength component by said polarization state rotating unit on the basis of a speed and scheme of modulation of the wavelength component, and a value of polarization mode dispersion of a transmission path on which the wavelength component is to be transmitted.

19. A wavelength division multiplexing optical transmission system having, on a transmission path, an optical add/drop multiplexer having a demultiplexing unit being able to demultiplex a signal light into wavelength components and output at least one of the wavelength components of the signal light through a drop port, and a multiplexing unit being able to multiplex at least one arbitrary wavelength component inputted through an add port and the demultiplexed wavelength components together into a wavelength division multiplexed signal light and output the wavelength division multiplexed signal light, said wavelength division multiplexing optical transmission system comprising:
    said optical add/drop multiplexer comprising:
        at least one polarization scrambler for rotating a polarization state of a corresponding one of wavelength components of a signal light to be outputted through said multiplexing unit;

said polarization scrambler comprising:
- a polarization state rotating unit for rotating the polarization state of the wavelength component of the signal light to be outputted through said multiplexing unit; and
- a rotation speed controlling unit for controlling rotation speed of the polarization state of the wavelength component of the signal light by said polarization state rotating unit on the basis of a speed and scheme of modulation of the wavelength component of the signal light, and a value of polarization mode dispersion of a transmission path on which the wavelength component is to be transmitted.

* * * * *

UNITED STATES PATENT AND TRADEMARK OFFICE
CERTIFICATE OF CORRECTION

PATENT NO.         : 7,583,895 B2
APPLICATION NO.    : 11/517392
DATED              : September 1, 2009
INVENTOR(S)        : Kentaro Nakamura et al.

It is certified that error appears in the above-identified patent and that said Letters Patent is hereby corrected as shown below:

Column 25, Line 6, change "demultipelxing" to --demultiplexing--.

Column 25, Line 37, change "demutliplexing" to --demultiplexing--.

Column 25, Line 51, change "port;" to --port,--.

Signed and Sealed this

Seventeenth Day of November, 2009

David J. Kappos
*Director of the United States Patent and Trademark Office*